US010034324B2

(12) United States Patent
Ramkumar et al.

(10) Patent No.: US 10,034,324 B2
(45) Date of Patent: Jul. 24, 2018

(54) OPTIMIZATION OF POWER CONSUMPTION IN DUAL SIM MOBILES IN CONNECTED MODE IN A WIRELESS NETWORK

(71) Applicant: Samsung Electronics Co., Ltd., Gyeonggi-do (KR)

(72) Inventors: Thirumalli Sureshsah Ramkumar, Bangalore (IN); Diwakar Sharma, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/656,693

(22) Filed: Jul. 21, 2017

(65) Prior Publication Data
US 2017/0325278 A1 Nov. 9, 2017

Related U.S. Application Data

(62) Division of application No. 15/009,352, filed on Jan. 28, 2016, now Pat. No. 9,769,867.

(30) Foreign Application Priority Data
Nov. 25, 2015 (IN) ..................... 6334/CHE/2015 CS

(51) Int. Cl.
*H04B 1/38* (2015.01)
*H04W 76/16* (2018.01)
(Continued)

(52) U.S. Cl.
CPC ........... *H04W 76/16* (2018.02); *H04W 8/082* (2013.01); *H04W 52/0212* (2013.01);
(Continued)

(58) Field of Classification Search
CPC ....... H04W 76/16; H04W 76/27; Y02D 70/00
(Continued)

(56) References Cited

U.S. PATENT DOCUMENTS

2013/0223227 A1 8/2013 Lee
2014/0295835 A1* 10/2014 Lamazure ........... H04W 60/005
455/434
(Continued)

*Primary Examiner* — Nghi H Ly
(74) *Attorney, Agent, or Firm* — The Farrell Law Firm, P.C.

(57) ABSTRACT

A method of optimizing connection mode procedures for a dual subscriber identity module (SIM) mobile communication device is provided. The method includes receiving, by a base station, a paging message for a first SIM in an idle mode from a core network; determining, by the base station, if a radio resource control (RRC) connection linked with the first SIM is available or not; triggering, by the base station, a second paging type message for the first SIM with a normal cause through the RRC connection linked with the first SIM if the RRC connection of the first SIM is available; determining, by the base station, if a RRC connection linked with a second SIM is available or not if the RRC connection of the first SIM is not available; triggering, by the base station, a second paging type message for the first SIM with a mapped new cause through the RRC connection linked with the second SIM if the second SIM is available; and triggering, by the base station, a first paging type message with a temporary identity and a cause received in the paging message from the core network through a paging channel if the RRC connection linked with the second SIM is not available.

20 Claims, 25 Drawing Sheets

(51) Int. Cl.
*H04W 76/02* (2009.01)
*H04W 52/02* (2009.01)
*H04W 76/04* (2009.01)
*H04W 8/08* (2009.01)
*H04W 68/02* (2009.01)
*H04W 76/27* (2018.01)
*H04W 72/12* (2009.01)
*H04W 88/06* (2009.01)
*H04W 88/08* (2009.01)
*H04W 8/18* (2009.01)
*H04W 60/00* (2009.01)

(52) U.S. Cl.
CPC ....... *H04W 68/02* (2013.01); *H04W 72/1268* (2013.01); *H04W 72/1273* (2013.01); *H04W 76/026* (2013.01); *H04W 76/046* (2013.01); *H04W 76/27* (2018.02); *H04W 8/18* (2013.01); *H04W 60/005* (2013.01); *H04W 88/06* (2013.01); *H04W 88/08* (2013.01); *Y02B 60/50* (2013.01); *Y02D 70/00* (2018.01)

(58) Field of Classification Search
USPC ................ 455/435.2, 435.1, 442, 432.1, 558
See application file for complete search history.

(56) References Cited

U.S. PATENT DOCUMENTS

| | | | |
|---|---|---|---|
| 2015/0004973 A1* | 1/2015 | Gude | H04W 76/025 455/435.2 |
| 2015/0056988 A1* | 2/2015 | Goel | H04W 60/005 455/434 |
| 2015/0065106 A1 | 3/2015 | Catovic | |
| 2015/0311934 A1 | 10/2015 | Jang | |
| 2016/0183238 A1 | 6/2016 | Buthier | |

* cited by examiner

OPTIMIZATION OF POWER CONSUMPTION IN DUAL SIM MOBILES IN CONNECTED MODE IN A WIRELESS NETWORK

PRIORITY

This application is a Divisional application of application Ser. No. 15/009,352 filed with the U.S. Patent and Trademark Office on Jan. 28, 2016, and claims priority under 35 U.S.C. § 119(a) to an Indian Complete Patent Application filed in the Indian Intellectual Property Office on Nov. 25, 2015 and assigned Serial No. 6334/CHE/2015 (CS), the entire disclosure of each of which is incorporated herein by reference.

BACKGROUND

1. Field of the Disclosure

The present disclosure relates generally to wireless communication, and more particularly to a system and method for optimization of power consumption in a dual subscriber identity module (SIM) mobile phone, where both SIMs are in fully connected mode or semi connected mode and use a single radio resource control (RRC) connection when both SIMs have registered on the same public land mobile network (PLMN) and listen on a same cell of the same PLMN.

2. Description of the Related Art

Wireless communication systems have developed through various generations, including a first-generation (1G) analog wireless phone service, a second-generation (2G) digital wireless phone service (including interim 2.5G and 2.75G networks) and third-generation (3G) and fourth-generation (4G) high speed data/Internet-capable wireless services. Currently, wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd generation partnership project (3GPP) Long Term Evolution (LTE) systems, and orthogonal frequency division multiple access (OFDMA) systems.

Currently, the market is mainly driven by users who want to switch between carriers to take advantage of the best deals. Business and professional users could use these phones to have a separate mobile number for personal and official calls. A large number of buyers of dual SIM mobile phones use the two SIMs on the mobile phone to switch between network providers if coverage gets patchy. In addition, people who are travelling from one state to other state usually use dual SIM mobile phones in order to get the services of the new state's local network provider.

FIG. 1 is a schematic of a dual SIM dual standby (DSDS) mobile phone and a dual SIM dual active (DSDA) mobile phone in connected mode. The dual SIM mobile phones are popularly classified into two categories:
  (i) DSDS, in which only one radio frequency (RF) Transceiver is present; and
  (ii) DSDA, in which two transceivers are present.

FIG. 2 is a schematic of security mode procedures. The dual SIM mobile phones where both SIMs have separate ciphering and integrity keys. The first SIM signaling is with the first SIM's circuit switched (CS) or packet switched (PS) ciphering and integrity keys and the second SIM signaling is with the second SIM's CS or PS ciphering and integrity keys.

The challenges that are faced by the dual SIM mobile phones in connected mode when camped on the same cell of the PLMN are as follows.

Among DSDS mobile phones in connected mode, when either one of the SIMs enters or remains in CS connected mode, then the other SIM which is in idle mode will not be able to receive paging for mobile terminated (MT) calls. In this case, both SIMs cannot remain in connected mode.

Among DSDA mobile phones in connected mode, the two transceivers present on the mobile phones are switched on for the complete duration, which increases the consumption of power. In addition, since both SIMs are camped on the same cell of a PLMN, most of the RRC procedures are duplicated.

Accordingly there is a need to provide a method and system for optimizing power consumption in dual SIM mobile phones, when both SIMs are camped and registered on the same cell of a PLMN.

SUMMARY

Accordingly, an aspect of the present disclosure provides an improved apparatus and method for reducing power consumption in a wireless user equipment (UE).

In accordance with an aspect of the present disclosure, a method is provided of connecting a dual subscriber identity module (SIM) mobile communication device, including receiving, by a receiver of a base station, a paging message for a first SIM of the mobile communication device in an idle mode; determining, by a processor of the base station, if a radio resource control (RRC) connection linked with the first SIM is available; triggering, by the processor of the base station, a second paging type message for the first SIM with a mapped normal cause received through the RRC connection linked with the first SIM, if the RRC connection of the first SIM is available; determining, by the processor of the base station, if the RRC connection linked with a second SIM is available, if the RRC connection of the first SIM is not available; and triggering, by the processor of the base station, a third paging type message for the first SIM with a mapped new cause through the RRC connection linked with the second SIM, if the second SIM is available.

In accordance with another aspect of the present disclosure, a base station is provided that includes a receiver configured to receive a paging message for a first subscriber identity module (SIM) of a dual SIM mobile communication device in an idle mode; and a processor configured to determine if a radio resource control (RRC) connection linked with the first SIM is available, trigger a second paging type message for the first SIM with a mapped normal cause through the RRC connection linked with the first SIM, if the RRC connection of the first SIM is available, determine if the RRC connection linked with a second SIM is available if the RRC connection of the first SIM is not available, and trigger a third paging type message for the first SIM with a mapped new cause through the RRC connection linked with the second SIM if the second SIM is available.

In accordance with another aspect of the present disclosure, a non-transitory computer-readable medium is provided having instructions embedded thereon, wherein the instructions, when performed on a computer processor, execute a method of a dual subscriber identity module (SIM) mobile communication device, and the method includes receiving a paging message for a first SIM of the mobile communication device in an idle mode; determining if a radio resource control (RRC) connection linked with the first SIM is available; triggering a second paging type message for the first SIM with a mapped normal cause received through the RRC connection linked with the first SIM, if the RRC connection of the first SIM is available; determining if the RRC connection linked with a second SIM is available, if the RRC connection of the first SIM is not available; and triggering a third paging type message for the first SIM with a mapped new cause through the RRC connection linked with the second SIM, if the second SIM is available.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF THE EMBODIMENTS OF THE PRESENT DISCLOSURE

Various embodiments of the present disclosure provide a method and system for optimization of power consumption in dual SIM mobile phones in a connected mode. In the following detailed description, reference is made to the accompanying drawings that form a part hereof, and in which are shown by way of illustration certain embodiments in which the present disclosure may be practiced. These embodiments of the present disclosure are described in sufficient detail to enable those skilled in the art to practice the present disclosure, and it is to be understood that other embodiments may be utilized and that changes may be made without departing from the scope and spirit of the present disclosure. The following detailed description is, therefore, not to be taken in a limiting sense, and the scope of the present disclosure is defined only by the appended claims and any equivalents thereof.

Further, although certain features of the present disclosure are illustrated in some of the accompanying drawings and not in others, this is done for convenience only as each feature may be combined with any or all of the other features in accordance with the present disclosure.

The present disclosure may refer to "an," "one" or "some" embodiment(s) of the present disclosure in several locations, which does not necessarily imply that each such reference is to the same embodiment(s), or that the feature only applies to a single embodiment. Single features of different embodiments of the present disclosure may also be combined to provide other embodiments.

As used herein, the singular forms "a," "an" and "the" are intended to include the plural forms as well, unless expressly stated otherwise. It will be further understood that the terms "includes," "comprises," "including" and/or "comprising" when used in the present disclosure, indicate the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meanings as commonly understood by one of ordinary skill in the art to which the present disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
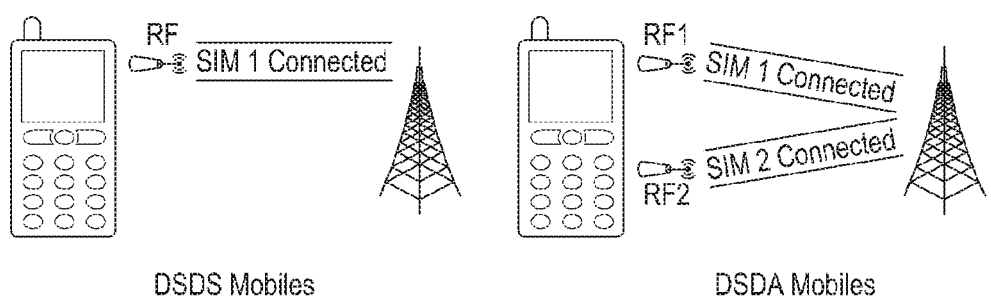
FIG. 1 is a schematic of a DSDS mobile phone and a DSDA mobile phone in a connected mode.
Figure 2:
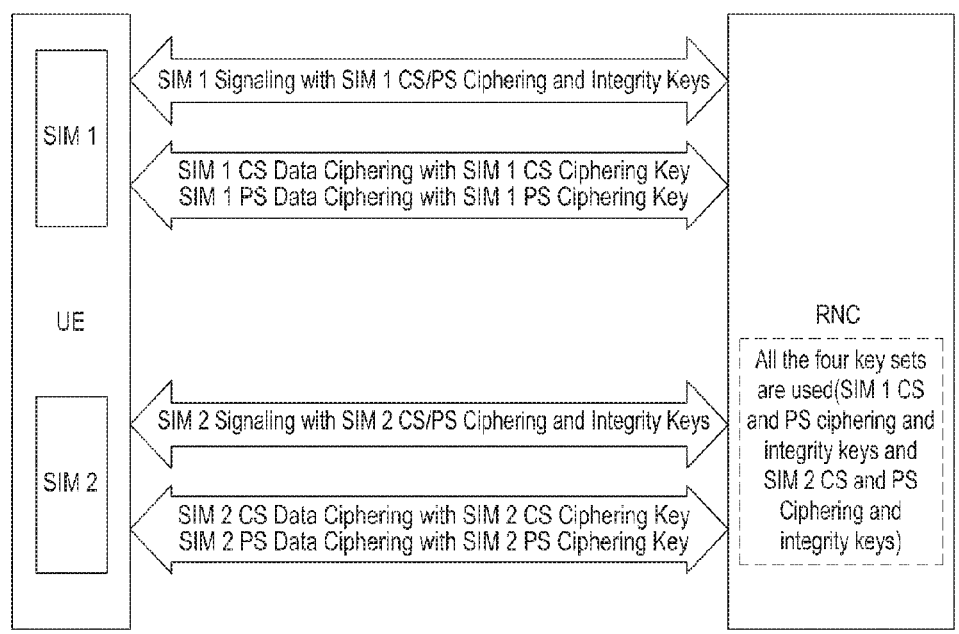
FIG. 2 is a schematic of security mode procedures.
Figure 3:
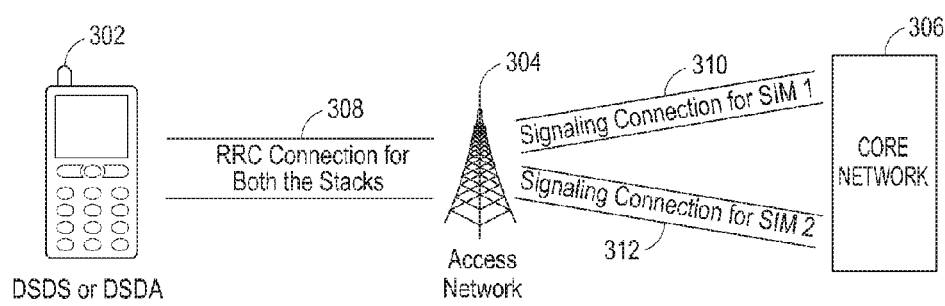
FIG. 3 is a schematic of a DSDS mobile phone and a DSDA mobile phone in a connected mode, according to an embodiment of the present disclosure.

FIG. 3 is a schematic of a DSDS mobile phone and a DSDA mobile phone in a connected mode, according to an embodiment of the present disclosure. According to an embodiment of the present disclosure, both SIMs (e.g. protocol stacks) of a DSDS or DSDA mobile phone 302 communicate with the access network 304 with a single RRC connection 308, and the access network communicates with a core network 306 with separate signaling connections 310, 312 for the corresponding SIMs, when both SIMs have got camped and registered on the same PLMN. Among the DSDS mobile phones in a connected mode, when either one of the SIMs enters or remains in a CS connected mode, then the other SIM which is in an idle mode will be able to receive paging for mobile terminated (MT) calls. In addition, both SIMs could remain in a connected mode. Among DSDA mobile phones in a connected mode, one of the two transceivers present on the mobile phones is switched off for the complete duration, which saves battery power. Furthermore, since it is a single RRC connection, none of the RRC procedures will be duplicated.

The modes of a dual SIM mobile phone are as follows in Table 1.

TABLE 1

| SIM 1 State | SIM 2 State | Type of dual SIM mobile |
| --- | --- | --- |
| IDLE | IDLE | Fully Idle Dual SIM Mobiles |
| IDLE | CONNECTED | Semi Connected Dual SIM Mobile |
| CONNECTED | IDLE | Semi Connected Dual SIM Mobile |
| CONNECTED | CONNECTED | Fully Connected Dual SIM Mobile |

According to an embodiment of the present disclosure, the term "neighbor SIM" denotes the other SIM which is available in the dual SIM mobile phone. For example, if SIM 1 and SIM 2 are in a dual SIM mobile phone, then SIM 1 is the neighbor SIM of SIM2 and SIM 2 is the neighbor SIM of SIM 1.

The semi-connected dual SIM mobile phones and fully connected dual SIM mobile phones will behave as follows.

In semi connected dual SIM mobile phones:
the UE will be receiving the paging message for the SIM which is in idle mode, through the RRC Connection which is available already for the Neighbor SIM; and in the UE side, the SIM which is in idle mode, will make use of the RRC connection of the connected mode SIM (which is already available) to trigger the initial message (initial direct transfer in UMTS/global system for mobile communications (GSM)) to the access network to initiate a signaling connection to core network.

In fully connected dual SIM mobile phones:
in the UE side, both the SIMs will send and receive their corresponding signaling messages and corresponding user data through the same RRC connection; and in the network side, the access network will send and receive signaling messages and user data of both SIMs through the same RRC connection.

The procedure for realizing the present disclosure in semi connected dual SIM mobile phones and fully connected dual SIM mobile phones are described below. The method of realizing the present disclosure is described for UMTS radio access technologies (RAT), even though the present disclosure is applies for all RATs.

According to an embodiment of the present disclosure, an operation of semi connected dual SIM mobile phones is described as follows. In a semi connected mode of operation, the SIM which is in an idle mode should be able to receive paging from a network and should also be able to trigger a request to the network for establishing a signaling connection. The method for achieving this is described below.

According to an embodiment of the present disclosure, reception of a paging message for the idle mode SIM is described as follows. When the paging message is received, the UE intimates that there is an incoming request for a certain SIM. The method of initiating the paging from the network side and also the method of differentiating the paging message of a certain SIM in the UE side is described below.

According to an embodiment of the present disclosure, triggering of a paging message at a core network is described as follows. The core network is the network entity which initiates the paging message to a UTRAN. As per 3GPP specification 25.413, a normal paging message from a core network to a UTRAN contains the following information:

permanent non-access stratum (NAS) UE identity (which is an international mobile subscriber identity (IMSI) of the UE to be paged);

temporary UE identity; and other information elements.

According to the present disclosure, in order to page a SIM of a dual SIM mobile phone, the core network includes the permanent NAS UE identity of the neighbor SIM in the paging message which must be sent to the UTRAN. The new field which is added in the paging message is named "neighbor SIM permanent NAS UE identity," which is the permanent NAS UE identity of the neighbor SIM of the SIM which must be paged.

The paging message from the core network to the UTRAN for a SIM of the dual SIM mobile phone will contain the following information:

permanent NAS UE identity (e.g. IMSI of the SIM to be paged);

neighbor SIM permanent NAS UE identity (e.g. IMSI of the neighbor SIM);

temporary UE identity (of the SIM to be paged); and other information elements.

The core network maintains a database of IMSI pairs (e.g. IMSIs of both SIMs in the dual SIM mobile phone), such that the core network can fetch the IMSI of the paired SIM of the corresponding dual SIM mobile phone to include the same in the paging message. The database of IMSI pairs maintained in the core network is named "dual SIM registered IMSI database." The dual SIM registered IMSI database maintained in the core network will contain the mapping of the IMSIs with the corresponding neighbor SIM IMSIs which were registered with the core network.

Figure 4:
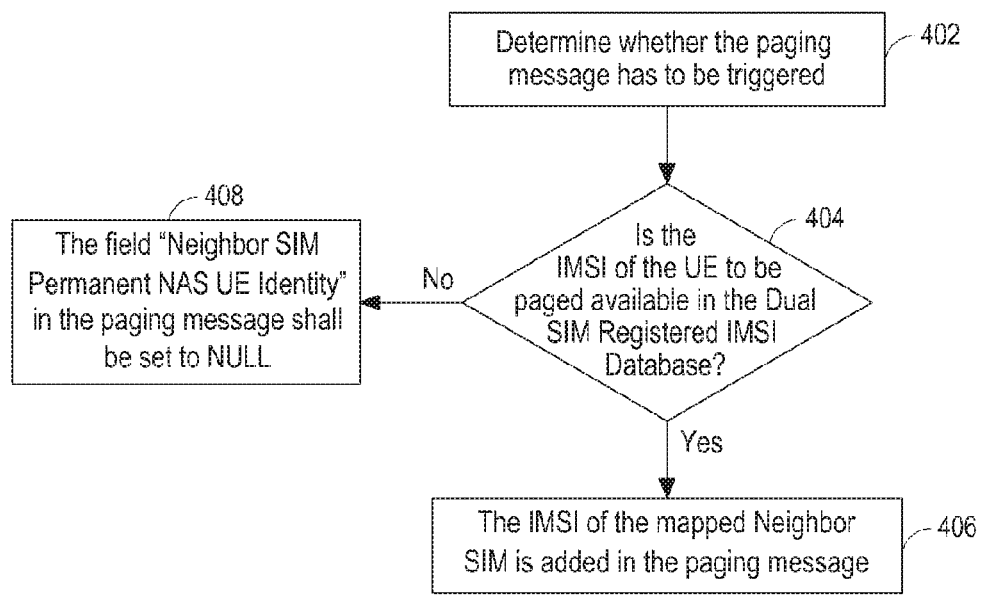
FIG. 4 is a flowchart of a method of triggering a paging message from a core network, according to an embodiment of the present disclosure.

FIG. 4 is a flowchart of a method of triggering a paging message from a core network.

Referring to FIG. 4, in step 402, it is determined whether the paging message must be triggered. In step 404, it is determined whether the IMSI of the UE to be paged is available in the dual SIM registered IMSI database. If the IMSI of the UE is found, in step 406, the IMSI of the mapped neighbor SIM is added in the paging message which must be triggered, under the field "neighbor SIM permanent NAS UE identity" along with the identities of the UE which must be paged. If the IMSI of the UE is not found, then in step 408, the field "neighbor SIM permanent NAS UE identity" in the paging message is set to "NULL."

According to an embodiment of the present disclosure, handling of a paging message at a UTRAN is described as follows. The UTRAN is the network entity which receives a paging message from the core network and triggers the paging type 1 message or paging type 2 message to the UE for which the paging was intended. The UTRAN will maintain temporary mobile subscriber identities (TMSIs) of corresponding RRC connections for triggering either paging type 1 or paging type 2 messages to the UEs.

Figure 5:
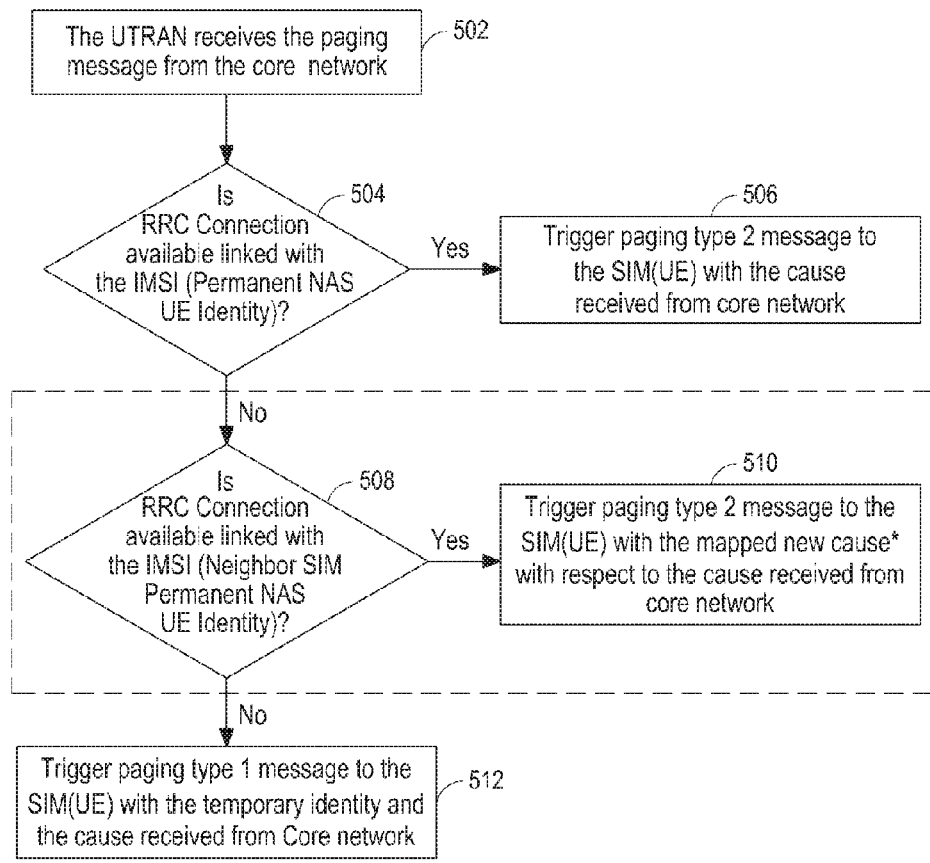
FIG. 5 is a flowchart of a method of handling paging in universal mobile telecommunications system (UMTS) terrestrial radio access network (UTRAN), according to an embodiment of the present disclosure.

FIG. 5 is a flowchart of a method of handling paging in a UTRAN.

Referring to FIG. 5, in step 502, the UTRAN receives the paging message from the core network. In step 504, it is determined if the RRC connection linked with the IMSI is available (e.g. permanent NAS UE identity). If the RRC connection linked with the IMSI is available, then in step 506, the paging type 2 message to the SIM (UE) with the cause received from the core network through the existing RRC connection of the SIM which has to be paged is triggered. If the RRC connection linked with the IMSI is not available, then in step 508, it is further determined if the RRC connection linked with the neighbor SIM IMSI (e.g. neighbor SIM permanent NAS UE identity) is available. If the RRC connection linked with the neighbor SIM IMSI is available, then in step 510, the paging type 2 message to the SIM (e.g. UE) with the mapped new cause with respect to the cause received from the core network through the existing RRC connection of the neighbor SIM of the SIM which must be paged is triggered. In addition, if the RRC connection linked with the neighbor SIM IMSI is not available, then in step 512, the paging type 1 message to the SIM (e.g. UE) with the temporary identity (TMSI) and the cause received in the paging message from the core network through the paging channel is triggered. Further the UTRAN maps the TMSI to the IMSI.

Table 2 below gives the type of paging and the cause value that are triggered by the UTRAN when it finds a RRC connection linked with a permanent NAS UE identity, a neighbor SIM permanent NAS UE identity, or nothing

TABLE 2

| Available RRC connection linked with | Paging type to be triggered |
|---|---|
| Permanent NAS UE Identity | Normal Paging Type 2 with Cause received from Core network. |
| Neighbor SIM Permanent NAS UE Identity | Paging Type 2 with the Mapped New cause with respect to the cause received from core network. |
| None | Normal Paging Type 1 |

The paging type 2 messages triggered through the linked RRC connection with the neighbor SIM permanent NAS UE identity, are triggered with the new cause in order to enable the SIM (e.g. UE) receiving the paging type 2 message to distinguish the paging type 2 message for its own SIM and the paging type 2 message for its neighbor SIM. While sending the paging type 2 messages through the RRC connection linked with the neighbor SIM permanent NAS UE identity, the cause value to be set in paging type 2 messages are derived in the UTRAN as illustrated in Table 3 below.

TABLE 3

| Paging Cause received from Core Network to UTRAN | Mapped Paging Cause to be sent to UE in Paging type 2 Message from UTRAN to SIM (UE) |
|---|---|
| Terminating Conversational Call | Neighbor SIM Terminating Conversational Call |
| Terminating Streaming Call | Neighbor SIM Terminating Streaming Call |
| Terminating Interactive Call | Neighbor SIM Terminating Interactive Call |
| Terminating Background Call | Neighbor SIM Terminating Background Call |
| Terminating High Priority Signaling | Neighbor SIM Terminating High Priority Signaling |
| Terminating Low Priority Signaling | Neighbor SIM Terminating Low Priority Signaling |
| Terminating - cause unknown | Neighbor SIM Terminating - cause unknown |

According to an embodiment of the present disclosure, differentiation of paging type 2 messages received by the connected mode SIM (e.g. UE) is described as follows. The connected mode SIM of a semi connected dual SIM mobile phone, will receive paging type 2 messages for its own SIM and also for its idle mode neighbor SIM, so the connected mode SIM will differentiate based on the "paging cause" received in the paging type 2 message from the UTRAN.

If a connected mode SIM receives the following causes in a paging type 2 message, then the paging type 2 message is for the connected mode SIM of the semi connected dual SIM mobile phone:
 terminating conversational call;
 terminating streaming call;
 terminating interactive call;
 terminating background call;
 terminating high priority signaling;
 terminating low priority signaling; and
 terminating cause unknown.

If a connected mode SIM receives the following causes in a paging type 2 message, then the paging type 2 messages is for the idle mode SIM of the semi connected dual SIM mobile phone:

neighbor SIM terminating conversational call;
neighbor SIM terminating streaming call;
neighbor SIM terminating interactive call;
neighbor SIM terminating background call;
neighbor SIM terminating high priority signaling;
neighbor SIM terminating low priority signaling; and
neighbor SIM terminating—cause unknown.

Figure 6:
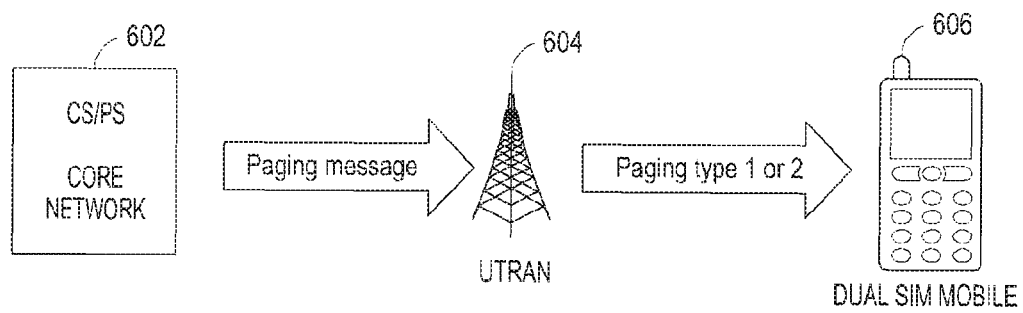
FIG. 6 is a schematic of a method of sending paging messages to a UE, according to an embodiment of the present disclosure.

FIG. 6 is a schematic of a method of sending paging messages to a UE. The method of sending paging type 1 or paging type 2 messages from a core network to the UE (e.g. dual SIM mobile phone) via a UTRAN is as follows.

Referring to FIG. 6, according to an embodiment of the present disclosure, in core network 602, the IMSI of the UE to be paged in the dual SIM registered IMSI database is searched for. If available, the IMSI of the neighbor SIM of the SIM which must be paged is fetched and added in the neighbor SIM permanent NAS UE identity of the paging message. The paging message also includes a temporary UE identity and permanent NAS UE identity (e.g. IMSI) which is then sent to the UTRAN. In the UTRAN 604, if a RRC connection exists with the permanent NAS UE identity then the paging type 2 message with a normal cause in the existing RRC connection is triggered. If the RRC connection exists with the neighbor SIM permanent NAS UE identity then the paging type 2 message with the mapped paging cause is triggered. Otherwise, the paging type 1 message is triggered. After the UE 606 receives the paging message including any of the paging type described above, it is enabled to distinguish for which SIM the paging message has been paged. If the paging type 2 message is received in the existing RRC connection of the connected mode SIM, then, depending on the paging cause, the SIM determines if the paging message is for the connected mode SIM or for the idle mode SIM.

According to an embodiment of the present disclosure, initiating a new signaling connection through an existing RRC connection is described as follows. The SIM (e.g. UE) triggers a request for a signaling connection for a certain domain through an initial direct transfer message to a UTRAN and in turn the UTRAN triggers an initial UE message to a core network, which triggers a signaling connection. In addition, the UE triggers an initial direct transfer message for a certain domain only once, until a signaling connection exists for that domain, but at the same time the UE could trigger an initial direct transfer for the other domain.

According to the present disclosure, the idle mode SIM of a semi connected dual SIM mobile phone makes use of the RRC connection of the neighbor SIM which is in a connected mode to send a request for initiation of the signaling connection. The below procedures describe the actions performed by the UE and the UTRAN to trigger a new signaling connection for the idle mode SIM.

According to an embodiment of the present disclosure, the triggering of an initial direct transfer message from an idle mode SIM is described as follows. When the idle mode SIM must trigger a NAS message to the core network, the idle mode SIM triggers an initial direct transfer message to the UTRAN through the existing RRC connection of the connected mode SIM, instead of triggering a new RRC connection establishment procedure for its own SIM. The initial direct transfer message contains an information element "Neighbor SIM Message" which indicates whether the initial direct transfer message is for the neighbor SIM or for the connected mode SIM. The possible value of the information element "neighbor SIM message" is either "TRUE" or "FALSE."

Figure 7:
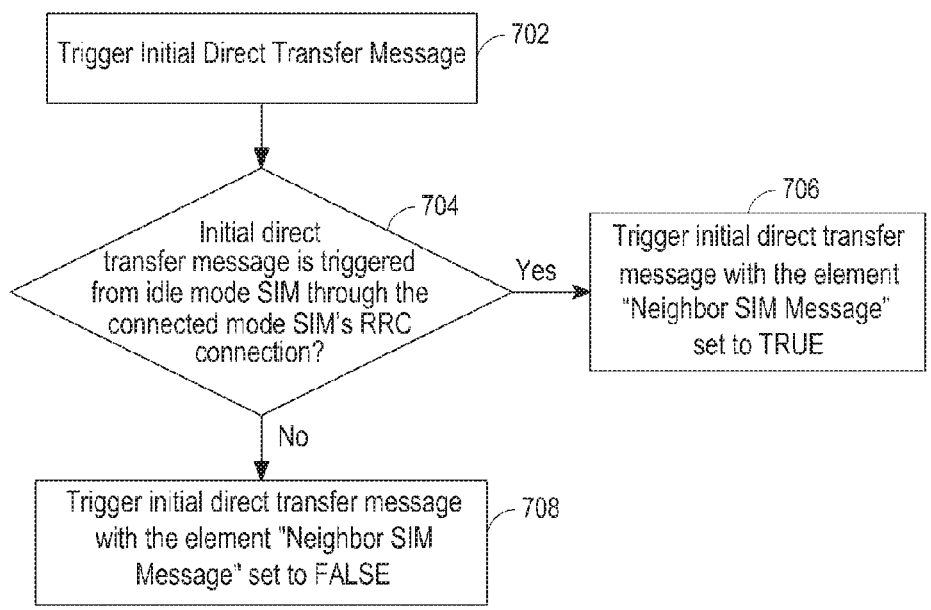
FIG. 7 is a flowchart of a dual SIM mobile phone function, according to an embodiment of the present disclosure.

FIG. 7 is a flowchart of a dual SIM mobile phone function, according to an embodiment of the present disclosure.

Referring to FIG. 7, in step 702, an initial direct transfer message is triggered from the UE. In step 704, it is determined if the initial direct transfer message is triggered from the idle mode SIM through the connected mode SIM's RRC connection. If the trigger is by the idle mode SIM, then in step 706, the initial direct transfer message is triggered with the information element "neighbor SIM message" set to "TRUE." Otherwise, in step 708, the initial direct transfer message is triggered with the information element "neighbor SIM message" set to "FALSE."

Figure 8:
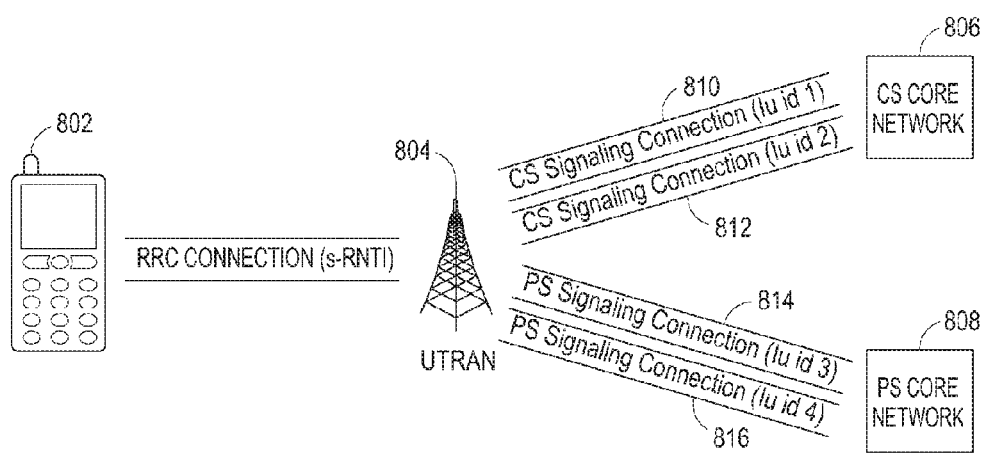
FIG. 8 is a schematic of UTRAN mapping between a RRC connection identifier of a dual SIM mobile phone serving radio network controller radio network temporary identifier (S-RNTI) and four signaling connection identifiers, according to an embodiment of the present disclosure.

FIG. 8 is a schematic of a UTRAN mapping between a RRC connection identifier of the dual SIM mobile (S-RNTI) and four signaling connection identifiers, according to an embodiment of the present disclosure.

Referring to FIG. 8, the two signaling connections, CS signaling connection (e.g. Iu id 1) 810 and CS signaling connection (e.g. Iu id 2) 812 are between the UTRAN 804 and the CS core network 806. Further, two signaling connections, PS signaling connection (e.g. Iu id 3) 814 and PS signaling connection (e.g. Iu id 4) 816, are between the UTRAN 804 and the PS core network 808.

According to an embodiment of the present disclosure, the handling of initial direct transfer message in UTRAN is described as follows. The UTRAN decodes the initial direct transfer message which is received from the UE and sends the UE's NAS message to the core network through an initial UE message, which will have an Iu signaling connection identifier.

Figure 9A:
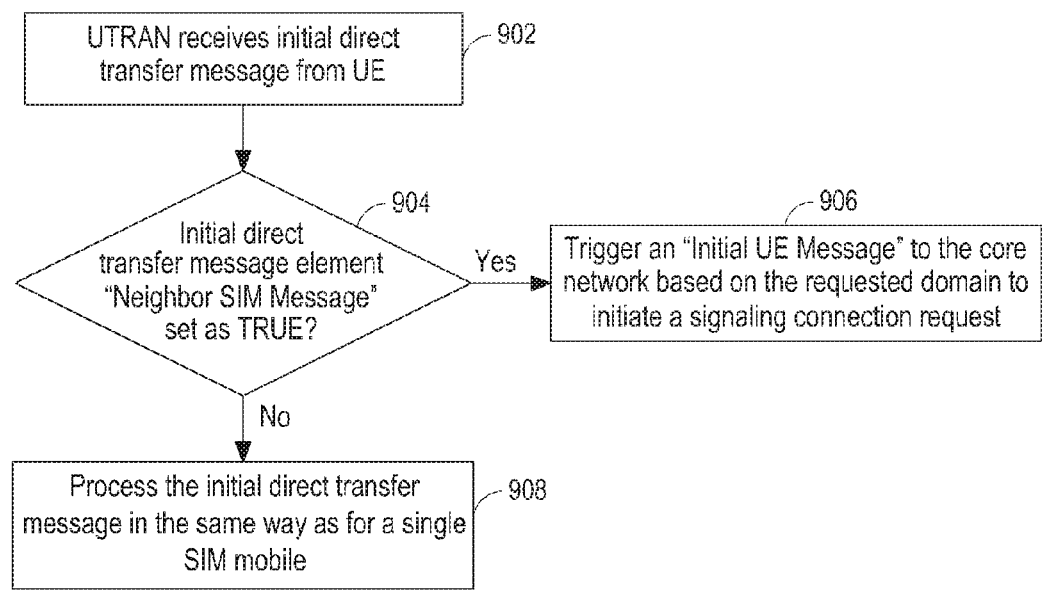
FIG. 9A is a flowchart of UTRAN behavior on reception of an initial direct transfer message, according to an embodiment of the present disclosure.

FIG. 9A is a flowchart of UTRAN behavior on reception of an initial direct transfer message.

Referring to FIG. 9A, according to an embodiment of the present disclosure, in step 902, the UTRAN receives an initial direct transfer message from the UE. In step 904, the UTRAN checks for the value of the information element "neighbor SIM message" in the initial direct transfer message. If the value is set as "TRUE," then in step 906, the UTRAN triggers an "initial UE message" to the core network based on the requested domain to initiate a signaling connection request even though a signaling connection exists for the connected mode SIM for the same domain. The Iu signaling connection identifier which is included in the initial UE message will be linked with the RRC connection corresponding to the dual SIM mobile (S-RNTI) from where the initial direct transfer message is received. If the value is set as "FALSE," then in step 908, the UTRAN processes the initial direct transfer message in the same way as for a single SIM mobile phone.

Figure 9B:
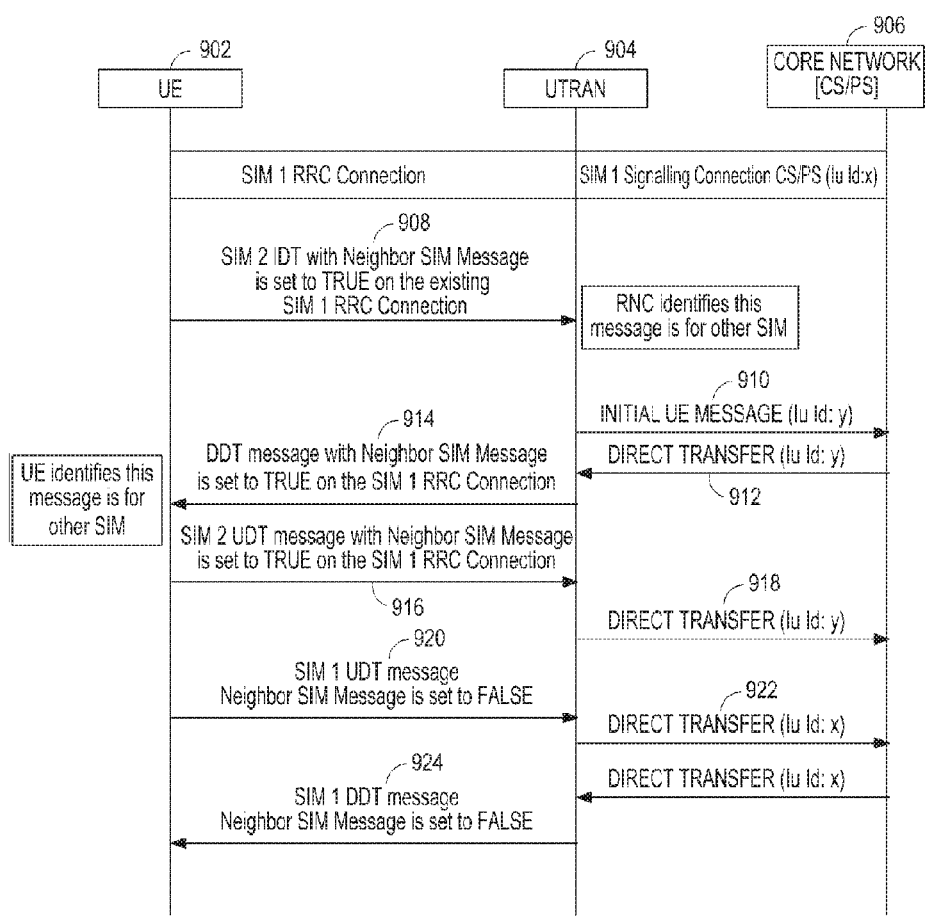
FIG. 9B is a flow diagram of differentiation of non-access stratum (NAS) messages, according to an embodiment of the present disclosure.

FIG. 9B is a flow diagram of differentiation of NAS messages, according to an embodiment of the present disclosure.

Referring to FIG. 9B, according to an embodiment of the present disclosure, the UTRAN 904 receives an initial direct transfer message from a UE 902 and the UTRAN 904 checks for the value of information element "neighbor SIM message" in the initial direct transfer message 908. If the value is set as "TRUE," the UTRAN 904 triggers an "initial UE message" 910 to the core network 906 based on the requested domain to initiate a signaling connection request even though there is a signaling connection existing for the connected mode SIM for the same domain. The core network 906 initiates the direct transfer 912 to the UTRAN 904 which in turn sends the downlink direct transfer (DDT) message 914 on the first SIM RRC connection with the "neighbor SIM message" set as "TRUE" to the UE 902.

After the UE 902 receives the DDT message, the second SIM sends the uplink direct transfer (UDT) message 916 on the first SIM RRC connection with "neighbor SIM message" set as "TRUE" to the UTRAN 904 and upon receiving the UDT message from the second SIM, the UTRAN 904 initiates the direct transfer 918.

If the UTRAN 904 receives the UDT message 920 from the first SIM with "neighbor SIM message" set as "FALSE," the UTRAN 904 processes the initial direct transfer message in the same way as for a single SIM mobile phone. The UTRAN 904 initiates and receives the direct transfer 922 and, further, sends the DDT message 924 to the UE 902 with "neighbor SIM message" set as "FALSE."

The UTRAN is enabled to differentiate the Iu signaling connection which had been initiated due to an initial direct transfer message with a value of information element "neighbor SIM message" set as "TRUE" and the Iu signaling connection which had been initiated due to an initial direct transfer message with a value of information element "neighbor SIM message" set as "FALSE."

The UTRAN understands that there could be a maximum of four signaling connections through the single RRC connection and out of the four signaling connections a maximum of 2 signaling connections will be for each SIM. When a maximum of four signaling connections are established, then the UTRAN maps all four Iu signaling connection identifiers to a single RRC connection identifier (S-RNTI).

According to an embodiment of the present disclosure, the operation of fully connected dual SIM mobile phones is described as follows. With regard to fully connected dual SIM mobile phone, the following terms are defined.

A parent SIM is a SIM which had initiated a RRC connection.

A child SIM is a SIM which makes use of a RRC connection initiated by a parent SIM to communicate with regard to its own SIM with a core network.

A parent SIM's signaling connection is a signaling connection established for a parent SIM. This is a signaling connection which is initiated by an initial direct transfer message from a dual SIM mobile phone with the value of information element "neighbor SIM message" set as "FALSE."

A child SIM's signaling connection is a signaling connection established for a child SIM. This is a signaling connection which is initiated by an initial direct transfer message from a dual SIM mobile with the value of information element "neighbor SIM message" set as "TRUE."

In the case of fully connected dual SIM mobile phones, both SIMs are enabled to send as well as receive signaling messages and user data through a single RRC connection. At the same time, a UTRAN is also enabled to send as well as receive the signaling messages and user data through the single RRC connection. The signaling messages are either from a NAS or an access stratum (AS). The method of handling both NAS and AS level signaling messages is described below.

According to an embodiment of the present disclosure, the handling of non-access stratum (NAS) signaling messages is described as follows. The NAS signaling message sent from a UE and received at a UTRAN is an uplink direct transfer (UDT) message. In addition, the NAS signaling message received at a UE and sent from a UTRAN is a downlink direct transfer (DDT) message. The UDT message and the DDT message each contains an additional information element "neighbor SIM message" in order to differentiate the messages from two different SIMs.

Figure 10:
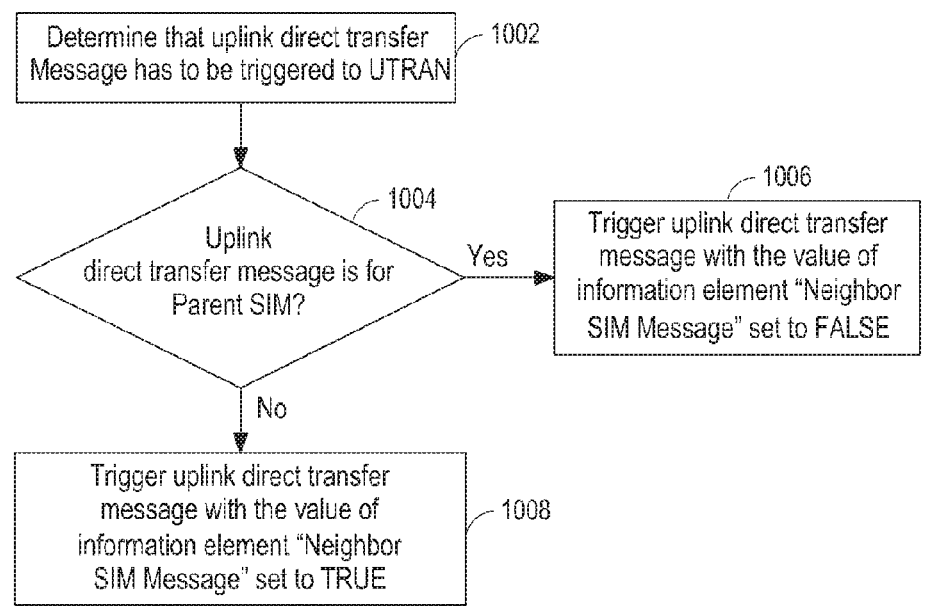
FIG. 10 is a flow chart of a method of transmission of NAS signaling messages at a UE side, according to an embodiment of the present disclosure.

FIG. 10 is a flowchart of a method of transmission of NAS signaling messages at a UE side. In this case, the transmission of NAS signaling messages is from a dual SIM mobile phone to a UTRAN.

Referring to FIG. 10, in step 1002, it is determined that the UDT message must be triggered to the UTRAN. In step 1004, it is determined if the UDT message is for a parent SIM. If the message is for the parent SIM, then in step 1006, the UDT message with the value of information element "neighbor SIM message" set to "FALSE" is triggered. In addition, if the message is not for the parent SIM, then in step 1008, the UDT message with the value of information element "neighbor SIM message" set to "TRUE" is triggered.

Figure 11:
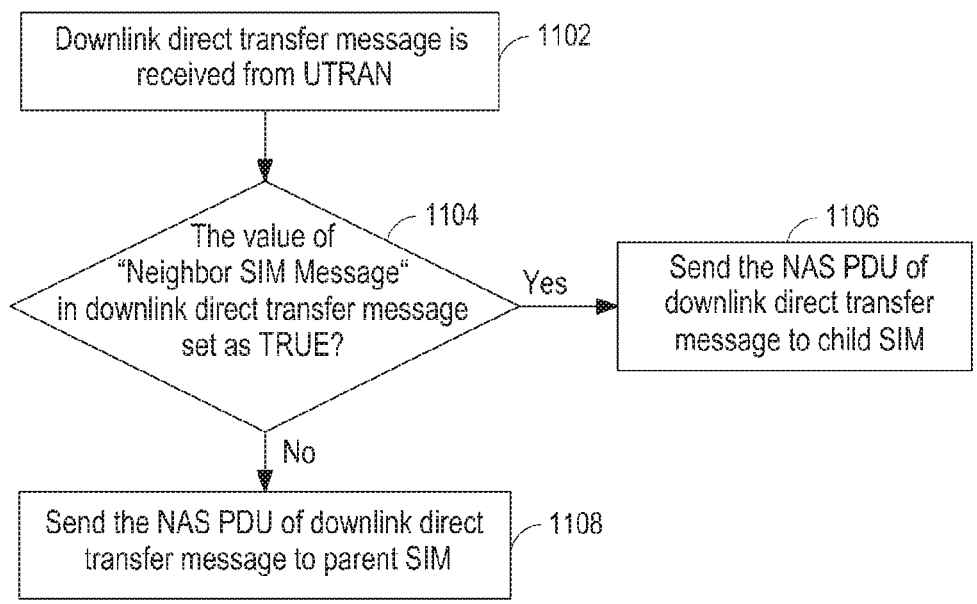
FIG. 11 is a flowchart of a method of reception of NAS signaling messages at a UE side, according to an embodiment of the present disclosure.

FIG. 11 is a flowchart of a method of reception of NAS signaling messages at a UE side. In this case, the reception of NAS signaling messages is at a dual SIM mobile phone from a UTRAN.

Referring to FIG. 11, in step 1102, the DDT message is received by the dual SIM mobile phone which has been sent from the UTRAN. In step 1104, the value of "neighbor SIM message" in the DDT message is determined. If the value is set as "TRUE," then in step 1106, the NAS protocol data unit (PDU) of the DDT message is sent to the child SIM. If the value is set as "FALSE," then in step 1108, the NAS PDU of the DDT message is sent to the parent SIM.

According to the present disclosure, for the UTRAN to function accordingly, it identifies and notes the signaling connections which were initiated by the initial direct transfer message with information element "neighbor SIM message" set as "TRUE," which is "child SIM's signaling connection" and also the signaling connections which were initiated by the initial direct transfer message with the information element "neighbor SIM message" set as "FALSE," which is "parent SIM's signaling connection."

Figure 12:
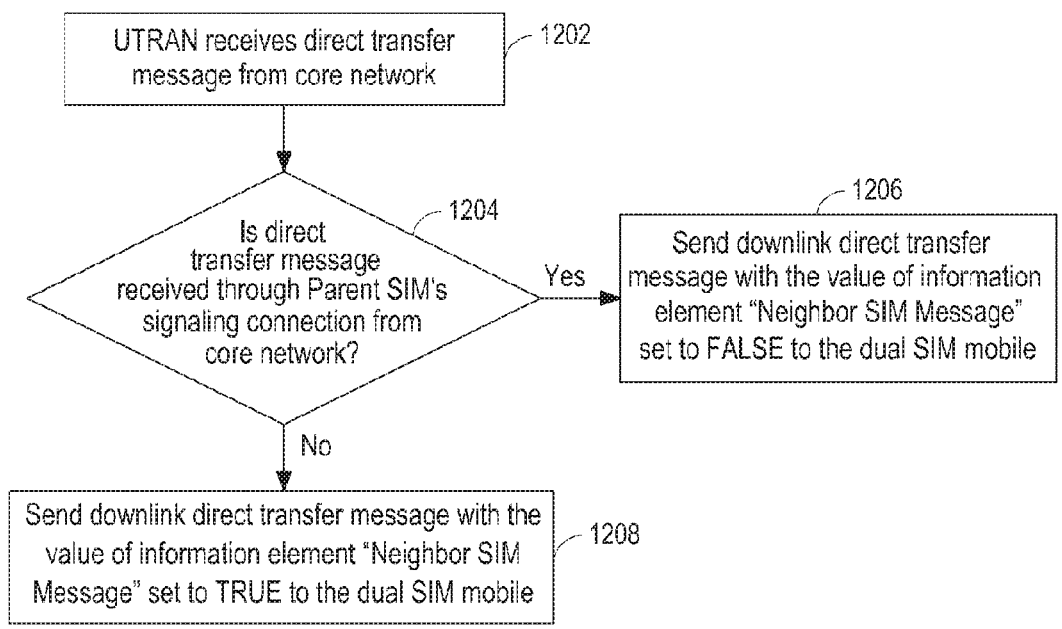
FIG. 12 is a flowchart of a method of transmission of NAS signaling messages at a UTRAN side, according to an embodiment of the present disclosure.

FIG. 12 is a flowchart of a method of transmission of NAS signaling messages at a UTRAN side. In this case, the transmission of NAS signaling messages is from the UTRAN to the dual SIM mobile phone.

Referring to FIG. 12, in step 1202, the UTRAN receives a direct transfer message from a core network. In step 1204, it is determined if the direct transfer message is received through a parent SIM's signaling connection or a child SIM's signaling connection from the core network. If it is received through the parent SIM's signaling connection, then in step 1206, the DDT message with the value of information element "neighbor SIM message" set as "FALSE" is sent to the dual SIM mobile phone through the mapped RRC connection. If it is received through the child SIM's signaling connection, then in step 1208, the DDT message with the value of information element "neighbor SIM message" set as "TRUE" is sent to the dual SIM mobile phone through the mapped RRC connection.

Figure 13:
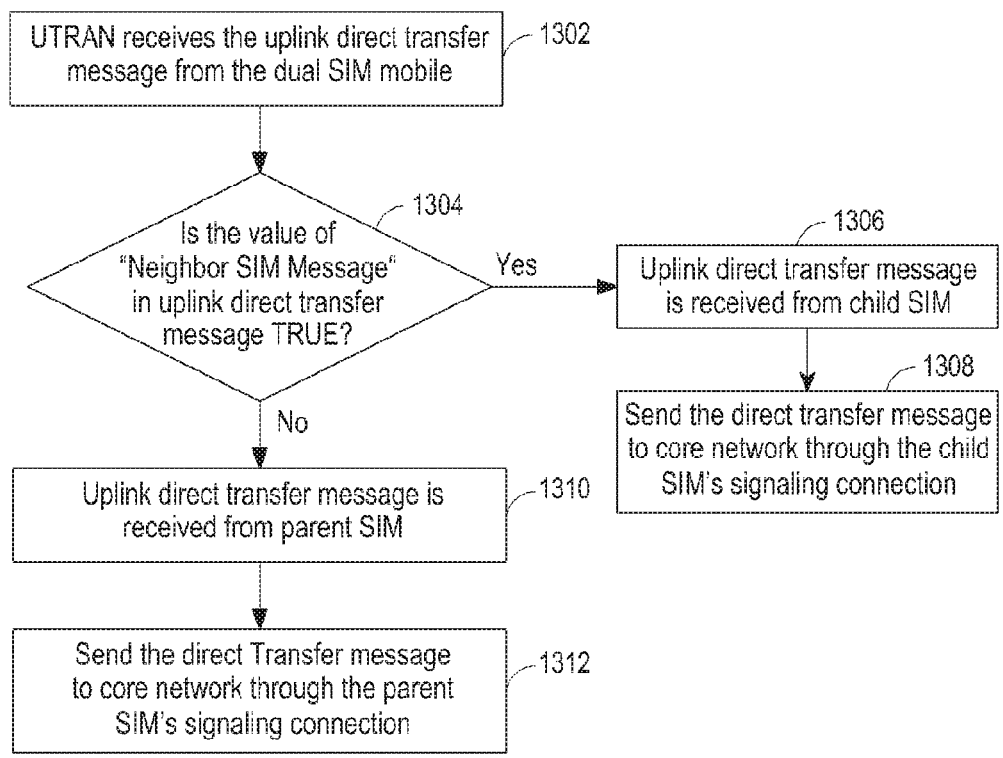
FIG. 13 is a flowchart of a method of reception of NAS signaling messages at a UTRAN side, according to an embodiment of the present disclosure.

FIG. 13 is a flowchart of a method of reception of NAS signaling messages at a UTRAN side, according to an embodiment of the present disclosure. In this case, the reception of NAS signaling messages is at the UTRAN from the dual SIM mobile phone.

Referring to FIG. 13, in step 1302, the UTRAN receives the UDT message from the dual SIM mobile phone. In step 1304, the value of information element "neighbor SIM message" in the UDT message is determined. If the value is set as "TRUE," then in step 1306, the UDT message is received from a child SIM. Further, in step 1308, the direct transfer message is sent to the core network with the NAS PDU received in the UDT message through the child SIM's signaling connection. If the value is set as "FALSE," then in step 1310, the UDT message is received from the parent SIM. Further, in step 1312, the direct transfer message is sent to the core network with the NAS PDU received in the UDT message through the parent SIM's signaling connection.

According to an embodiment of the present disclosure, the handling of access stratum (AS) signaling messages is described as follows. According to the present disclosure, both SIM's of a dual SIM mobile phone share the same RRC connection, and most of the AS signaling messages will be handled by the parent SIM only. However, some of the AS signaling messages which contain information about the Iu signaling connection are described below.

According to an embodiment of the present disclosure, radio bearer management procedures are described as follows. For the dual SIM mobile phones, in order to enable data transfer on both SIMs with the single RRC connection, the radio bearer setup procedures are managed accordingly. The core network initiates the procedure for radio access bearer (RAB) assignment, which in turn will initiate the procedure for radio bearer (RB) establishment from the UTRAN.

Two methods have been proposed for the radio access bearer management of the fully connected dual SIM mobile phone. In the first method, while assigning RB identity and RAB identity, the UTRAN and core network consider both SIMs of the dual SIM mobile phone as separate SIMs of different mobile phones. This indicates that there could be repetition of the same RB identifier or same RAB identifier for both SIMs and the UTRAN will manage the same internally.

According to an embodiment of the present disclosure, SIM 1 is assigned with RAB 5 under which RB 5, RB 6, and RB 7 are available. In addition, SIM 2 is also assigned with RAB 5 under which RB 5, RB 6, and RB 7 are available or RB 8, RB 6, and RB 7 are available. Whenever the UTRAN must communicate with the dual SIM mobile phone for setup, reconfiguration or release of radio bearers/radio access bearers then the UTRAN adds an additional information element "neighbor SIM message" in both the RAB level and the RB level in any of the possible 3GPP defined messages which contains setup, reconfiguration or release of radio bearers. This facilitates the dual SIM mobile phone to differentiate the RABs and RBs for the SIMs.

According to an embodiment of the present disclosure, the handling of radio bearer management procedures in the UTRAN is described as follows.

Figure 14:
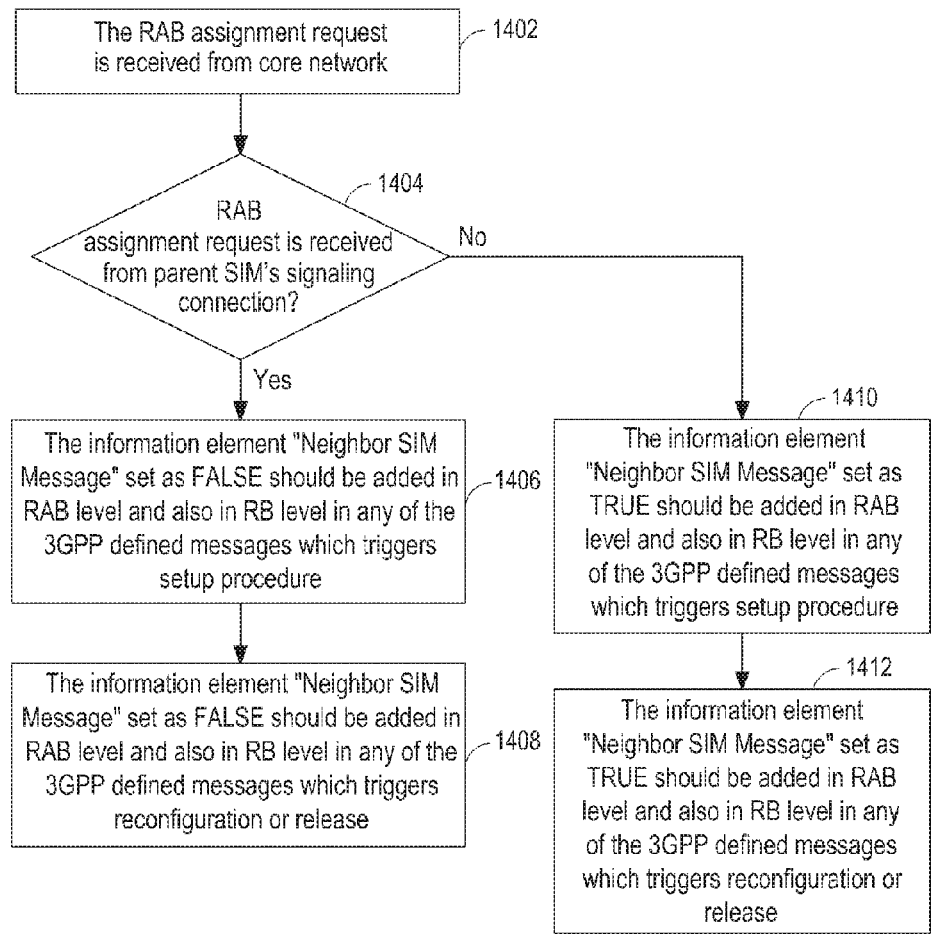
FIG. 14 is a flowchart of a method of triggering radio bearer management procedures in a UTRAN, according to an embodiment of the present disclosure.

FIG. 14 is a flowchart of a method of triggering radio bearer management procedures in a UTRAN.

Referring to FIG. 14, in step 1402, the RAB assignment request is received from the core network. In step 1404, it is determined if the request is received through a parent SIM's signaling connection or a child SIM's signaling connection. If it is received through the parent SIM's signaling connection, then in step 1406, setup procedures for radio bearers/radio access bearers to the dual SIM mobile through the linked RRC connection with the additional information element "neighbor SIM message" set to FALSE are triggered. The information element "neighbor SIM message" is added in the RAB level and also in the RB level in any of the 3GPP defined messages which trigger a setup procedure. Further, in step 1408, procedures to trigger reconfiguration or release of these particular radio bearers/radio access bearers also contains the information element "neighbor SIM message" set to FALSE. The information element "neighbor SIM message" is added in the RAB level and also in the RB level in any of the 3GPP defined messages which trigger reconfiguration or release.

If the request is received through the child SIM's signaling connection, then in step 1410, setup procedures for radio bearers/radio access bearers to the dual SIM mobile through the linked RRC connection with the additional information element "neighbor SIM message" set to "TRUE" are triggered. The information element "neighbor SIM message" is added in the RAB level and also in the RB level in any of the 3GPP defined messages which trigger a setup procedure. Further, in step 1412, procedures to trigger reconfiguration or release of these particular radio bearers/radio access bearers also contain the information element "neighbor SIM message" set to "TRUE." The information element "neighbor SIM message" is added in the RAB level and also in the RB level in any of the 3GPP defined messages which trigger reconfiguration or release.

In this method, the information element "neighbor SIM message" is added at the RAB level and also at the RB level. In addition, if RB information is mentioned under the RAB information, then in that case, the information element "neighbor SIM message" could be added only at the RAB level.

According to an embodiment of the present disclosure, the 3GPP defined "RAB information to setup" information element contains the information element "neighbor SIM message" at the RAB level only, since "RB information to setup" is available under the information element "RAB information to setup." Also, the 3GPP defined "RB information to reconfigure" information element contains the information element "neighbor SIM message" at the RB level, since the identity of the RAB is not added in this information element.

According to an embodiment of the present disclosure, the handling of radio bearer management procedures in dual SIM mobile phones is described as follows. The dual SIM mobile phone differentiates the RABs and the RBs for the SIMs based on the value of information element "neighbor SIM message," since it is possible that the identities of the RAB and the RB assigned by a radio network controller (RNC) and the core network may be same. When a dual SIM mobile phone receives setup, reconfiguration or release of the radio bearers through any of the messages specified in the 3GPP specification, the dual SIM mobile phone will operate as described below.

Figure 15:
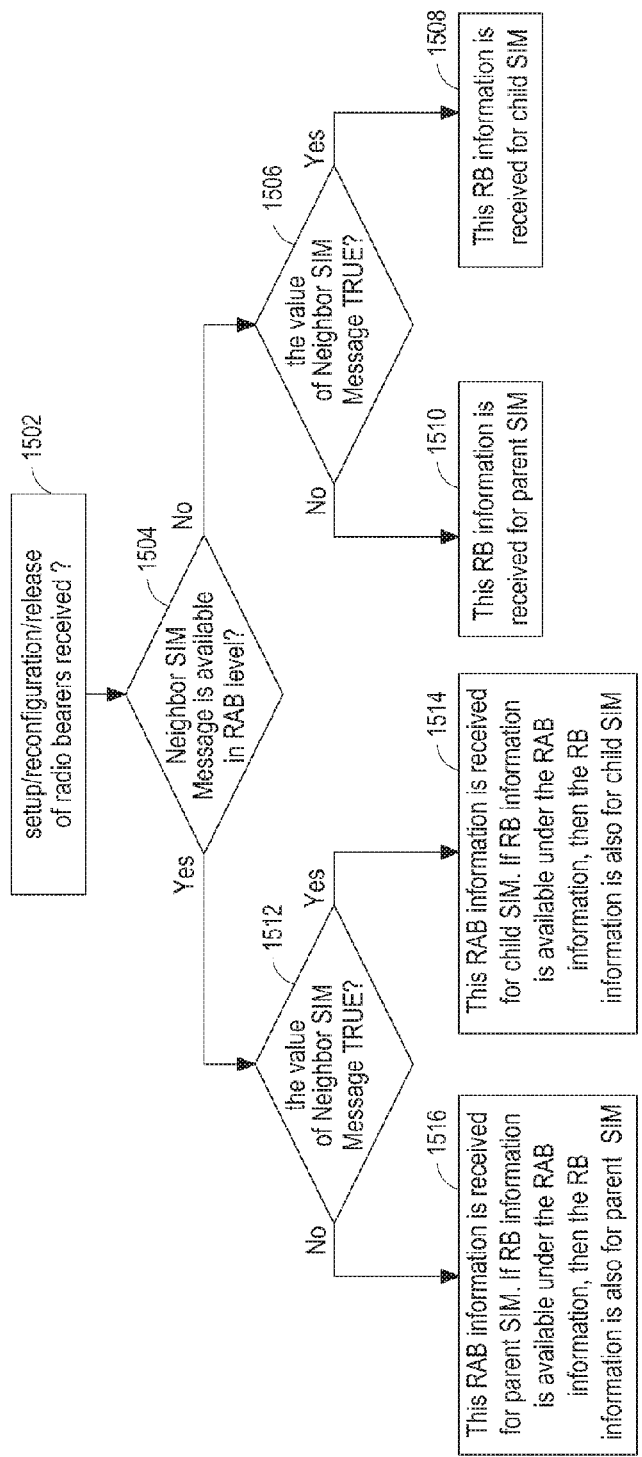
FIG. 15 is a flowchart of a method of handling radio bearer management procedures in a dual SIM mobile phone, according to an embodiment of the present disclosure.

FIG. 15 is a flowchart of a method of handling radio bearer management procedures in a dual SIM mobile phone.

Referring to FIG. 15, in step 1502, the setup, reconfiguration or release of radio bearers is received. In step 1504, it is determined if the neighbor SIM message is available in the RAB level or the RB level. If it is available in the RB level, then in step 1506, the value of neighbor SIM message is determined. If the value is "TRUE," then in step 1508, the RAB information received is for the child SIM. If the value is "FALSE," then in step 1510, the RB information received is for the parent SIM. If the neighbor SIM message is available in the RAB level, then in step 1512, the value of the neighbor SIM message is determined. If the value is "TRUE," then in step 1514, the RAB information received is for the child SIM. If the RB information is available under the RAB information, then the RB information is also for the child SIM. If the value is "FALSE," then in step 1516, the RAB information received is for the parent SIM. If the RB information is available under the RAB information, then the RB information is also for the parent SIM.

In the second method, while assigning RAB identifiers, the core network will consider the SIMs of the dual SIM mobile phone as two separate SIMs, but while assigning RB identifiers, the UTRAN will consider the SIMs of the dual SIM mobile phone as the same, which indicates that the RAB identifiers assigned to the SIMs may be the same, but the RB identifiers assigned will be different.

According to an embodiment of the present disclosure, SIM 1 is assigned with RAB 5 under which RB 5, RB 6 and RB 7 are available. In addition, SIM 2 is also assigned with the RAB 5 under which RB 5, RB 6 and RB 7 are not there since the UTRAN has already assigned the same to the other SIM of the dual SIM mobile phone. Whenever the UTRAN must communicate with the dual SIM mobile phone for setup, reconfiguration or release of radio bearers/radio access bearers then the UTRAN adds an additional information element "neighbor SIM message" in only the RAB level in any of the possible 3GPP defined messages which contain setup, reconfiguration or release of radio bearers/radio access bearers. This facilitates the dual SIM mobile phone to differentiate the RABs for the SIMs.

According to an embodiment of the present disclosure, the handling of radio bearer management procedures in a UTRAN is described as follows.

Figure 16:
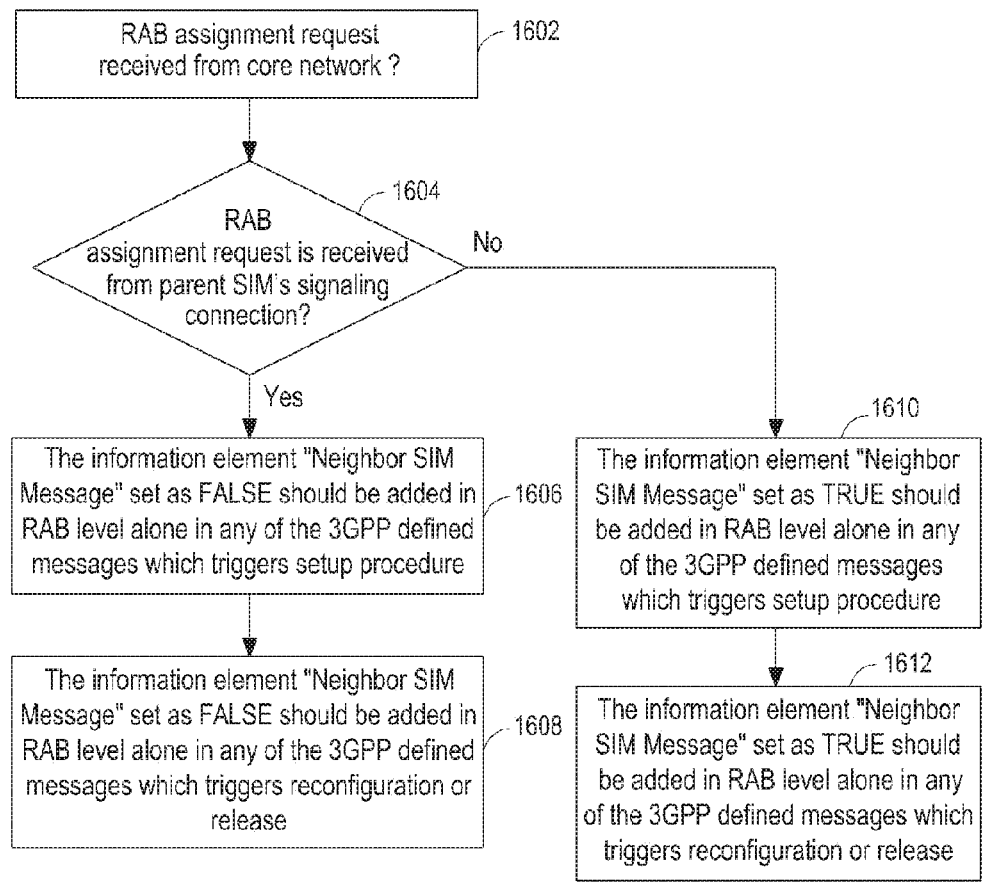
FIG. 16 is a flowchart of a method of radio bearer management procedures in a UTRAN, according to an embodiment of the present disclosure.

FIG. 16 is a flowchart of a method of radio bearer management procedures in the UTRAN.

Referring to FIG. 16, in step 1602, the RAB assignment request is received from the core network. In step 1604, it is determined if the request is received through a parent SIM's signaling connection or a child SIM's signaling connection. If it is received through the parent SIM's signaling connection, then in step 1606, setup procedures for radio bearers/radio access bearers to the dual SIM mobile phone through the linked RRC connection with the additional information element "neighbor SIM message" set to "FALSE" are triggered. The information element "neighbor SIM message" are added in only the RAB level in any of the 3GPP defined messages which trigger setup procedures. Further, in step 1608, procedures to trigger reconfiguration or release of these particular radio bearers/radio access bearers also contain the information element "neighbor SIM message" set to "FALSE." The information element "neighbor SIM message" is added in only the RAB level in any of the 3GPP defined messages which trigger reconfiguration or release.

If the RAB assignment request is received through the child SIM's signaling connection, then in step 1610, setup procedures for radio bearers/radio access bearers to the dual SIM mobile through the linked RRC connection with the additional information element "neighbor SIM message" set to "TRUE" are triggered. The information element "neighbor SIM message" is added only in the RAB level in any of the 3GPP defined messages which trigger setup procedures. Further, in step 1612, procedures to trigger reconfiguration or release of these radio bearers/radio access bearers also contain the information element "neighbor SIM message" set to "TRUE." The information element "neighbor SIM message" is added only in the RAB level in any of the 3GPP defined messages which trigger reconfiguration or release.

In this method, the information element "neighbor SIM message" is added only at the RAB level, since the UTRAN will not be assigning the same RB identity to the two SIMs.

In both the first method and the second method described above, it is possible for the UTRAN to send setup/reconfiguration/release of the RBs for the SIMs in one message. In both methods, after handling the setup, reconfiguration, or release of the radio bearers in the dual SIM mobile phone, the parent SIM triggers the corresponding complete message to the UTRAN.

According to an embodiment of the present disclosure, the handling of radio bearer management procedures in a dual SIM mobile phone is described as follows. The dual SIM mobile phone will differentiate the RABs based on the additional information element "neighbor SIM message," since the identities of the RABs assigned by the core network may be the same, whereas for the RBs, the UTRAN will not assign the same RB identities to both of the SIMs of the dual SIM mobile phone. When a dual SIM mobile phone receives setup, reconfiguration or release of the radio bearers through any of the messages specified in the 3GPP specification, the dual SIM mobile phone will operate as described below.

Figure 17:
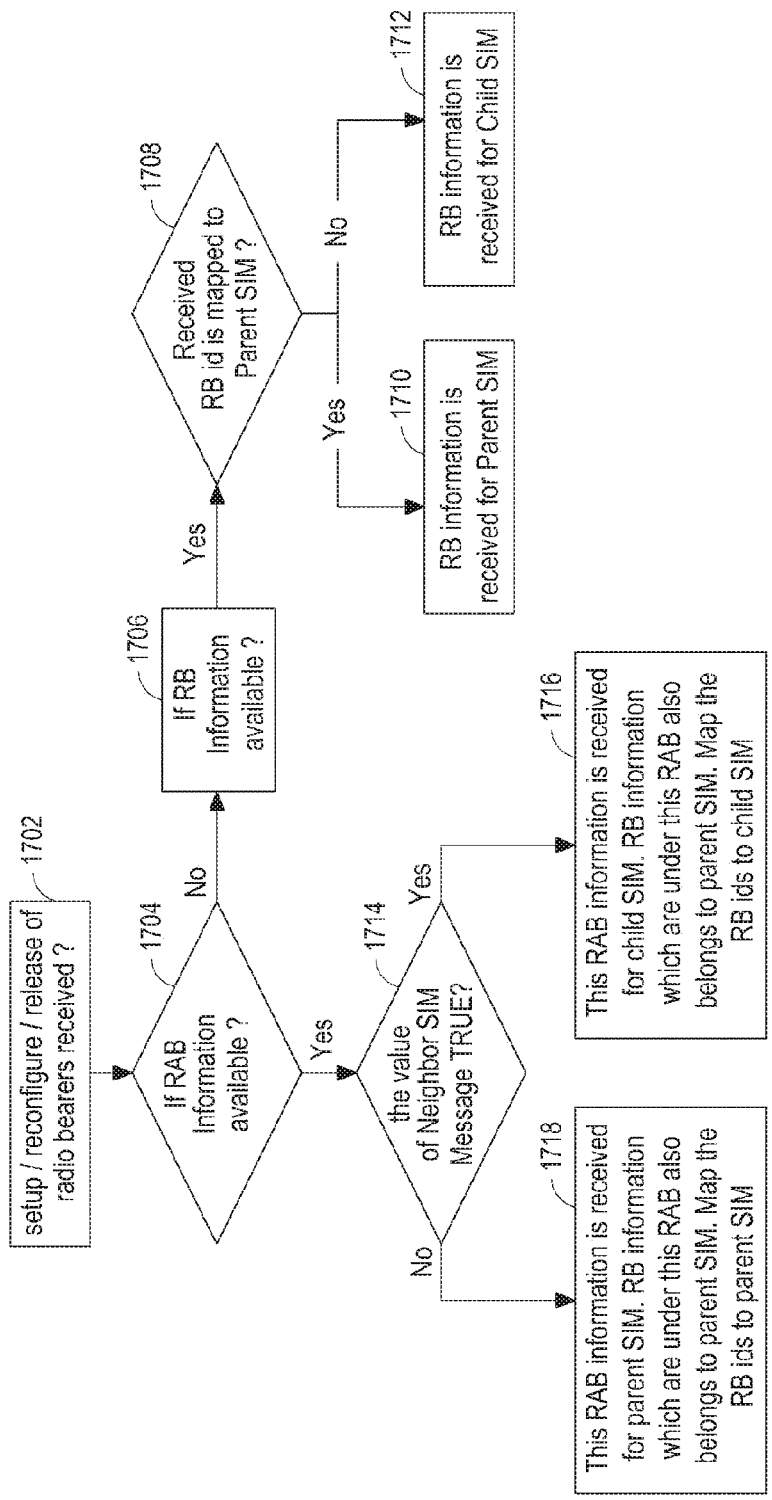
FIG. 17 is a flowchart of a method of handling radio bearer management procedures in a dual SIM mobile phone, according to an embodiment of the present disclosure.

FIG. 17 is a flowchart of a method of handling radio bearer management procedures in a dual SIM mobile phone, according to an embodiment of the present disclosure.

Referring to FIG. 17, in step 1702, the setup, reconfiguration, or release of radio bearers is received. In step 1704, it is determined if the RAB information is available. If the RAB information is not available, then in step 1706, the RB information is available. Further, in step 1708, it is determined if the received RB identifier is mapped to the parent SIM. If the RB identifier is mapped to the parent SIM, then in step 1710, the RB information received is for the parent SIM. If the RB identifier is mapped to the child SIM, then in step 1712, the RB information received is for the child SIM. If the RAB information is available, then in step 1714, the value of the neighbor SIM message is determined. If the value is "TRUE," then in step 1716, the RAB information received is for the child SIM. The RB information which are under this RAB also belongs to the child SIM. The RB identifiers are mapped to the child SIM. If the value is "FALSE," then in step 1718, the RAB information received is for the parent SIM. The RB information which are under this RAB also belongs to the parent SIM. The RB identifiers are mapped to the parent SIM.

According to an embodiment of the present disclosure, security mode control procedures are described as follows. The security mode procedures were defined in order to maintain a secured over-the-air interface such that the UE's data and signaling messages are maintained confidentially.

As the same as the radio bearer management procedures, an additional information element "neighbor SIM message" is added to the security mode command message which will be sent to the dual SIM mobile phone from the UTRAN. This helps both of the SIMs of the dual SIM mobile phone to differentiate the security mode command messages for the corresponding SIMs.

According to an embodiment of the present disclosure, the handling of the security mode control procedure at the UTRAN is described as follows. The UTRAN receives the security mode command message from a certain core network domain in order to make the UE intimate about the configuration of the ciphering and integrity protection information.

Figure 18:
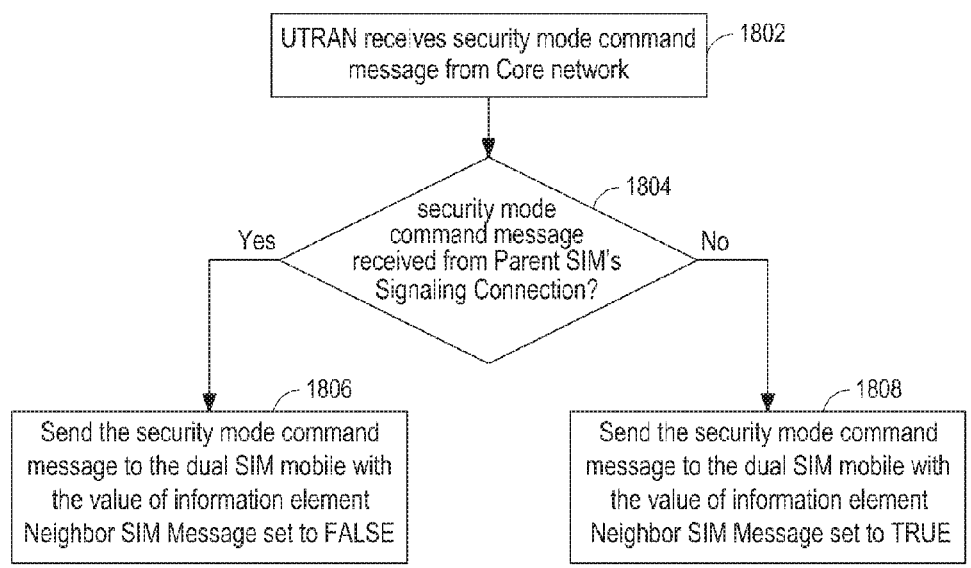
FIG. 18 is a flowchart of a method of triggering a security mode command message from a UTRAN to a dual SIM mobile phone, according to an embodiment of the present disclosure.

FIG. 18 is a flowchart of a method of triggering a security mode command message from a UTRAN to a dual SIM mobile phone.

Referring to FIG. 18, in step 1802, the UTRAN receives a security mode command message from a core network. In step 1804, it is determined if the security mode command message is received from a parent SIM's signaling connection or a child SIM's signaling connection. If the security mode command message is from the parent SIM's signaling connection, in step 1806, the security mode command message is sent to the dual SIM mobile phone with the value of information element Neighbor SIM Message set to "FALSE." If the security mode command message is from the child SIM's signaling connection, in step 1808, the security mode command message is sent to the dual SIM mobile phone with the value of information element "neighbor SIM message" set to "TRUE."

According to an embodiment of the present disclosure, the handling of the security mode control procedure at the dual SIM mobile phone is described as follows. The UTRAN sends the security mode command message to the dual SIM mobile phone with the value of information element "neighbor SIM message" set as either "TRUE" or "FALSE." In response to the security mode command message received, the dual SIM mobile phone transmits either a security mode complete or a security mode failure message to the UTRAN. The security mode complete or the security mode failure message will not contain the information element "neighbor SIM message." The UTRAN considers a security mode complete or a security mode failure message as a response to the last sent security mode command message for the parent SIM or the child SIM.

Figure 19:
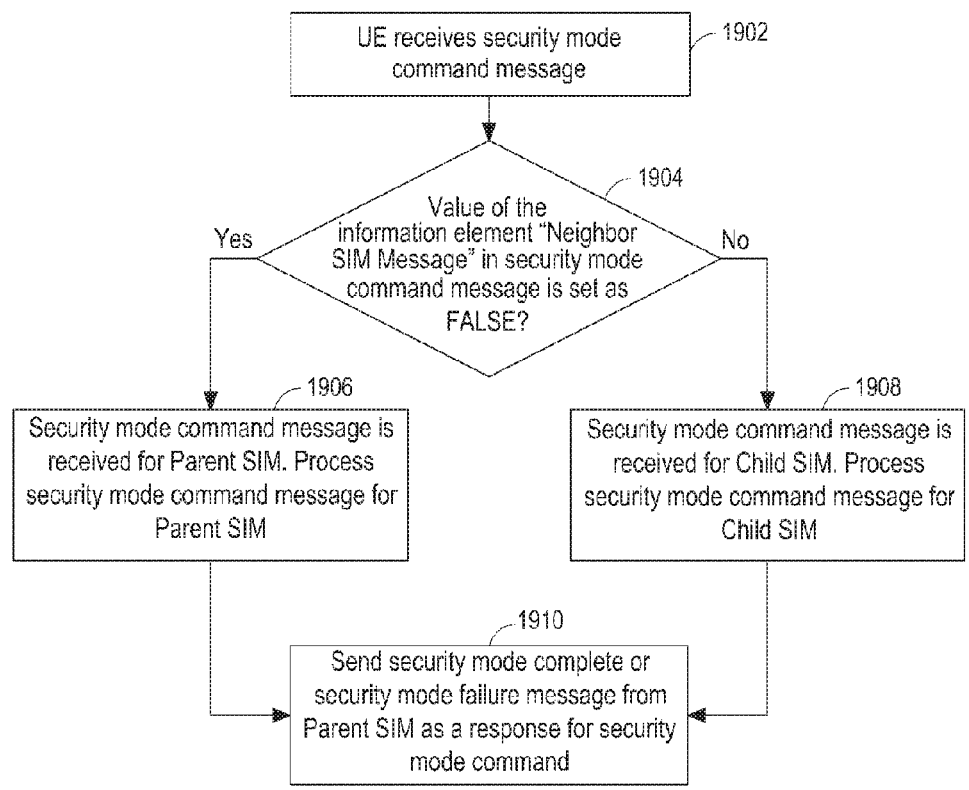
FIG. 19 is a flowchart of a method of handling security mode procedures at a dual SIM mobile phone, according to an embodiment of the present disclosure.

FIG. 19 is a flowchart of a method of handling security mode procedures at a dual SIM mobile phone.

Referring to FIG. 19, in step 1902, a UE receives a security mode command message from a UTRAN. In step 1904, the value of the information element "neighbor SIM message" in the security mode command message is determined. If the value is set as "FALSE," then in step 1906, the security mode command message and the process security mode command message is received for the parent SIM. If the value is set as "TRUE," then in step 1908, the security mode command message and the process security mode command message is received for the child SIM. In step 1910, the UE sends the security mode complete or the security mode failure message from the parent SIM in response to the security mode command message.

According to an embodiment of the present disclosure, the usage and application of ciphering and integrity keys are described as follows. For a present single SIM mobile phone, when security mode procedures are being setup for both the circuit switched (CS) core network and the packet switched (PS) core network domains, the CS data of the user is ciphered with the ciphering keys received from the CS core network and the PS data of the user is ciphered with the ciphering keys received from the PS core network. The signaling messages is ciphered and integrity protected with the last received ciphering and integrity keys (out of the CS and the PS ciphering and integrity keys).

According to an embodiment of the present disclosure, the ciphering and integrity protection for signaling radio bearers is described as follows. According to the present disclosure, for the dual SIM mobiles phones, since the signaling radio bearers are common for both of the SIMs of the dual SIM mobile phone, the signaling radio bearers will be ciphered and integrity protected by the last updated ciphering and integrity keys out of the CS domain ciphering and integrity keys of a first SIM (e.g. SIM 1), PS domain ciphering and integrity keys of SIM 1, CS domain ciphering and integrity keys of a second SIM (e.g. SIM 2) and PS domain ciphering and integrity keys of SIM 2.

According to an embodiment of the present disclosure, the ciphering for data radio bearers is described as follows. Three methods which have been identified for data radio bearers are as follows.

In the first method, the CS data radio bearers of SIM 1 will be ciphered with the SIM 1 CS ciphering keys. The PS data radio bearers of SIM 1 will be ciphered with the SIM 1 PS ciphering keys. The CS data radio bearers of SIM 2 will be ciphered with the SIM 2 CS ciphering keys. The PS data radio bearers of SIM 2 will be ciphered with the SIM 2 PS ciphering keys.

In the second method, the CS data radio bearers of SIM 1 and SIM 2 will be ciphered with the last updated CS ciphering key from the SIM 1 CS ciphering key and the SIM 2 CS ciphering key. The PS data radio bearers of SIM 1 and SIM 2 will be ciphered with the last updated PS ciphering key from the SIM 1 PS ciphering key and the SIM 2 PS ciphering key.

In the third method, the CS and PS data radio bearers of SIM 1 and SIM 2 will be ciphered with the last updated ciphering key from the SIM 1 CS ciphering key, the SIM 2 CS ciphering key, the SIM 1 PS ciphering key, and the SIM 2 PS ciphering key.

According to an embodiment of the present disclosure, the handling of signaling connection release procedures is described as follows. The release of the signaling connection is triggered by,
the UE;
the UTRAN; or
the core network.

The reason for these entities triggering the release of the signaling connection depends on many scenarios. The messages that are transferred between the UE and the UTRAN for the release of a signaling connection are a signaling connection release message from the UTRAN to UE and a signaling connection release indication message from the UE to the UTRAN.

According to the present disclosure, as the same for other messages, a signaling connection release message from the UTRAN and a signaling connection release indication message from a dual SIM mobile phone contain an information element "neighbor SIM message," in order to differentiate the messages of both of the SIMs.

The below procedures describe the handling of a signaling connection release procedure at a dual SIM mobile phone and also at a UTRAN.

According to an embodiment of the present disclosure, the triggering of a signaling connection release message from a UTRAN is described as follows.

Figure 20:
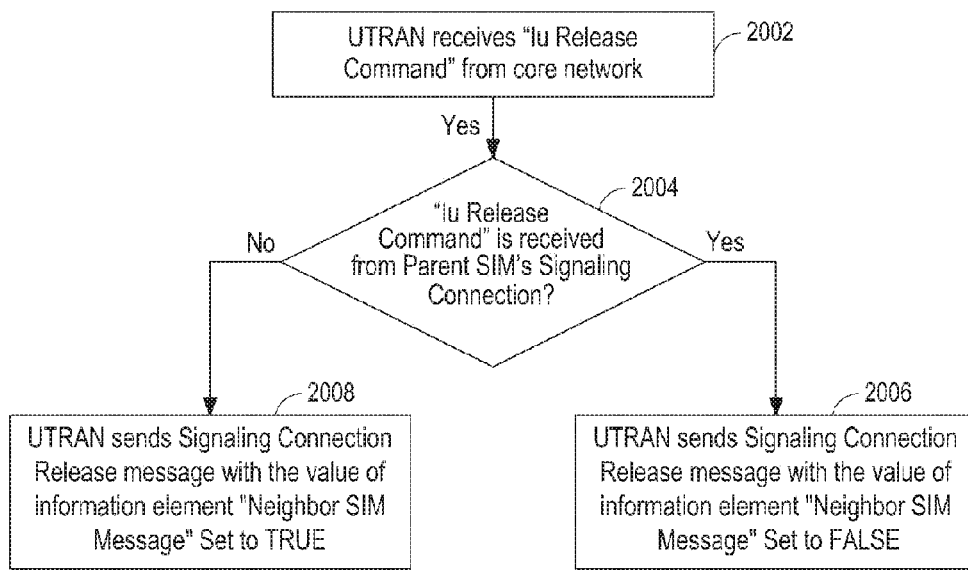
FIG. 20 is a flowchart of a method of triggering a signaling connection release message from a UTRAN, according to an embodiment of the present disclosure.

FIG. 20 is a flowchart of a method of triggering a signaling connection release message from a UTRAN.

Referring to FIG. 20, in step 2002, the UTRAN receives a "Iu release command" from a core network. In step 2004, it is determined if the "Iu release command" is received from a parent SIM's signaling connection or from a child SIM's signaling connection. If the "Iu release command" is received from the parent SIM's signaling connection, then in step 2006, the trigger signaling connection release message is sent from the UTRAN to the UE through the mapped RRC connection with the value of information element "neighbor SIM message" set to "FALSE." If the "Iu release command" is received from the child SIM's signaling connection, then in step 2008, the trigger signaling connection release message is sent from the UTRAN to the UE through the mapped RRC connection with the value of the information element "neighbor SIM message" set to "TRUE."

According to an embodiment of the present disclosure, the reception of a signaling connection release indication message in a UTRAN is described as follows.

Figure 21:
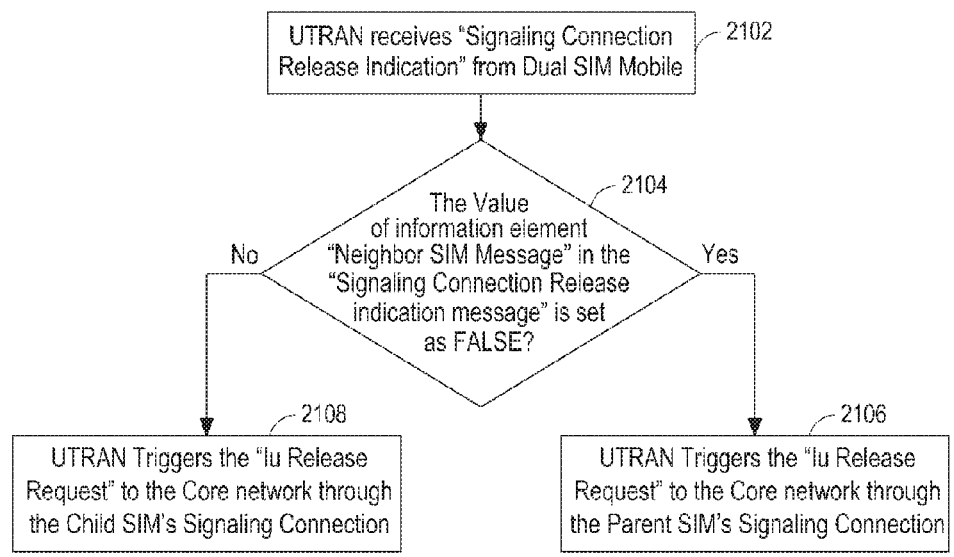
FIG. 21 is a flowchart of a method of reception of a signaling connection release indication in a UTRAN, according to an embodiment of the present disclosure.

FIG. 21 is a flowchart of a method of reception of a signaling connection release indication message in the UTRAN.

Referring to FIG. 21, in step 2102, the UTRAN receives "signaling connection release indication" from the dual SIM mobile phone. In step 2104, it is determined if the value of information element "neighbor SIM message" in the signaling connection release indication message is set as "TRUE" or "FALSE." If the value is set as "FALSE," then in step 2106, the UTRAN triggers the "Iu release request" to the core network through the parent SIM's signaling connection. If the value is set as "TRUE," then in step 2108, the UTRAN triggers the "Iu release request" to the core network through the child SIM's signaling connection.

According to an embodiment of the present disclosure, the transmission of the signaling connection release indication message from the dual SIM mobile phone is described as follows.

Figure 22:
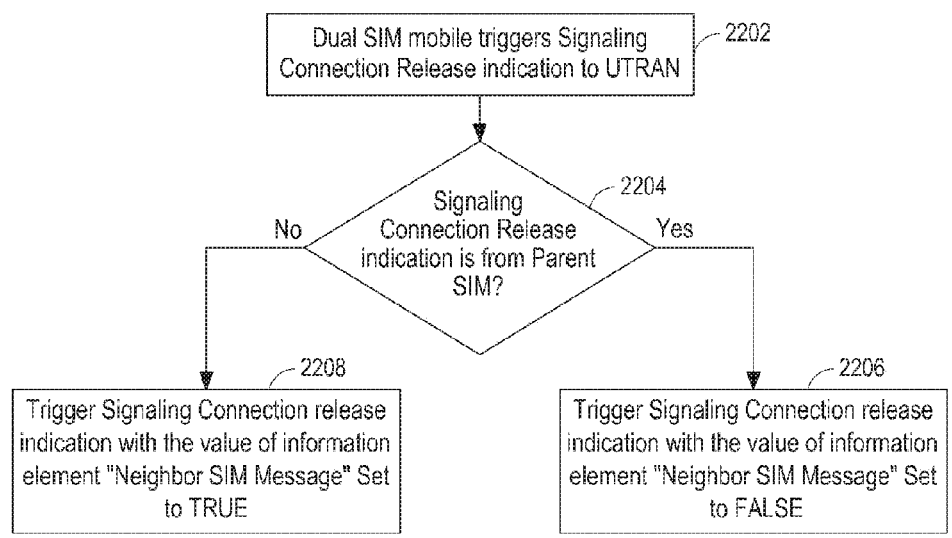
FIG. 22 is a flowchart of a method of triggering a signaling connection release indication from a dual SIM mobile phone, according to an embodiment of the present disclosure.

FIG. 22 is a flowchart of a method of triggering a signaling connection release indication message from a dual SIM mobile phone.

Referring to FIG. 22, in step 2202, either of the SIMs will trigger the signaling connection release indication message to the UTRAN. In step 2204, it is determined if the signaling connection release indication message is from a parent SIM or a child SIM. If it is from the parent SIM, then in step 2206, the signaling connection release indication message will be triggered with the value of information element "neighbor SIM message" set to "FALSE." If the signaling connection release indication message is from the child SIM, then in step 2208, the signaling connection release indication message will be triggered with the value of information element "neighbor SIM message" set to "TRUE."

A typical UE will trigger a signaling connection release indication message, even in the case of fast dormancy.

According to the present disclosure, for the dual SIM mobile phone, the signaling connection release indication message is triggered for fast dormancy only when there is no PS data transfer or a CS call has been in progress for a certain amount of time (e.g. implementation dependent fast dormancy time) in the radio bearers that were established for the SIMs which were in connected mode.

According to an embodiment of the present disclosure, the reception of a signaling connection release message in a dual SIM mobile phone from a UTRAN is described as follows.

Figure 23:
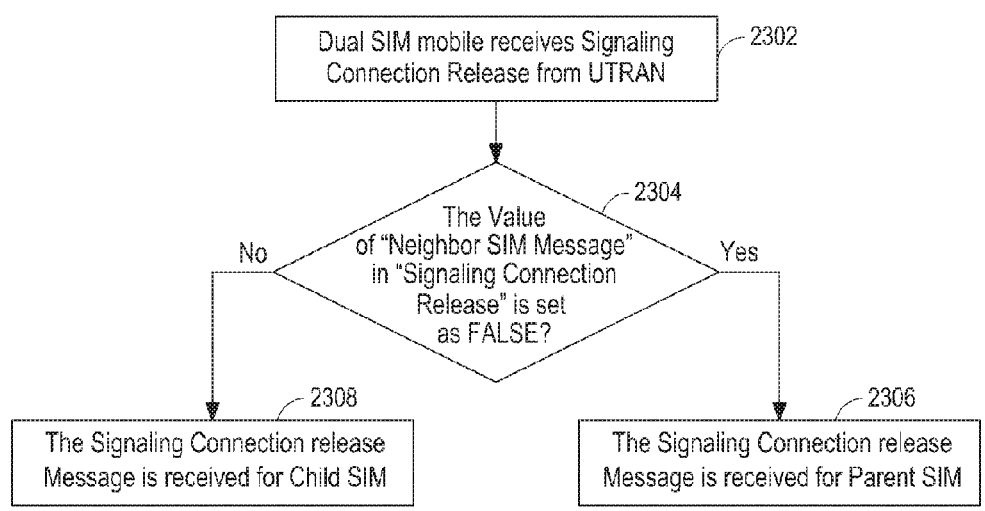
FIG. 23 is a flowchart of a method of reception of a signaling connection release message in a dual SIM mobile phone, according to an embodiment of the present disclosure.

FIG. 23 is a flowchart of a method of reception of a signaling connection release message in a dual SIM mobile phone.

Referring to FIG. 23, in step 2302, the dual SIM mobile phone receives a signaling connection release message from the UTRAN. In step 2304, it is determined if the value of information element "neighbor SIM message" in the signaling connection release message is set as "TRUE" or "FALSE." If the value is set as "FALSE," then in step 2306, the signaling connection release message is received for the parent SIM. If the value is set as "TRUE," then in step 2308, the signaling connection release message is received for the child SIM.

According to an embodiment of the present disclosure, the RRC connection release procedures are described as follows. The UTRAN is the entity which will trigger the RRC connection release procedures to the UE. For a single SIM mobile phone, the UTRAN will trigger the RRC connection release with the cause as user inactivity when there is no activity on the RBs that are mapped to a certain UE.

According to the present disclosure, in the case of a dual SIM mobile phone, the UTRAN determines the activity of all of the RBs that are mapped to both of the SIMs for triggering the RRC connection release with the cause as user inactivity, which indicates that the UTRAN does not trigger the RRC connection release with the cause user inactivity when there is no activity either on the parent SIM or the child SIM, when both of the SIMs are in connected mode.

According to an embodiment of the present disclosure, the procedures triggered by a UTRAN to a core network are described as follows. There are some procedures which are triggered by the UTRAN to the core network in a single SIM mobile phone as a result of a UE's measurement information (for example serving radio network subsystem (SRNS) relocation).

According to the present disclosure, in the case of a dual SIM mobile phone, if a UTRAN wants to trigger any procedure to a core network and the procedure corresponds to a link between the UTRAN and the dual SIM mobile phone, then the UTRAN triggers the messages corresponding to this procedure to both the parent SIM's signaling connection and to the child SIM's signaling connection, when both of the SIMs of the dual SIM mobile phone are in connected mode.

According to an embodiment of the present disclosure, a dual SIM registered IMSI database is described as follows. The purpose of maintaining a dual SIM registered IMSI database is to avail paging coordination on the network side. Two methods are proposed for maintaining the dual SIM registered IMSI database.

When both of the SIMs of the dual SIM mobile phone are registered on the same cell of a PLMN, the core network will derive the permanent identity (e.g. IMSI) of both of the SIMs and store them in the dual SIM registered IMSI database. The core network will maintain a mapping between both IMSIs which were identified from the temporary identities.

Figure 24:
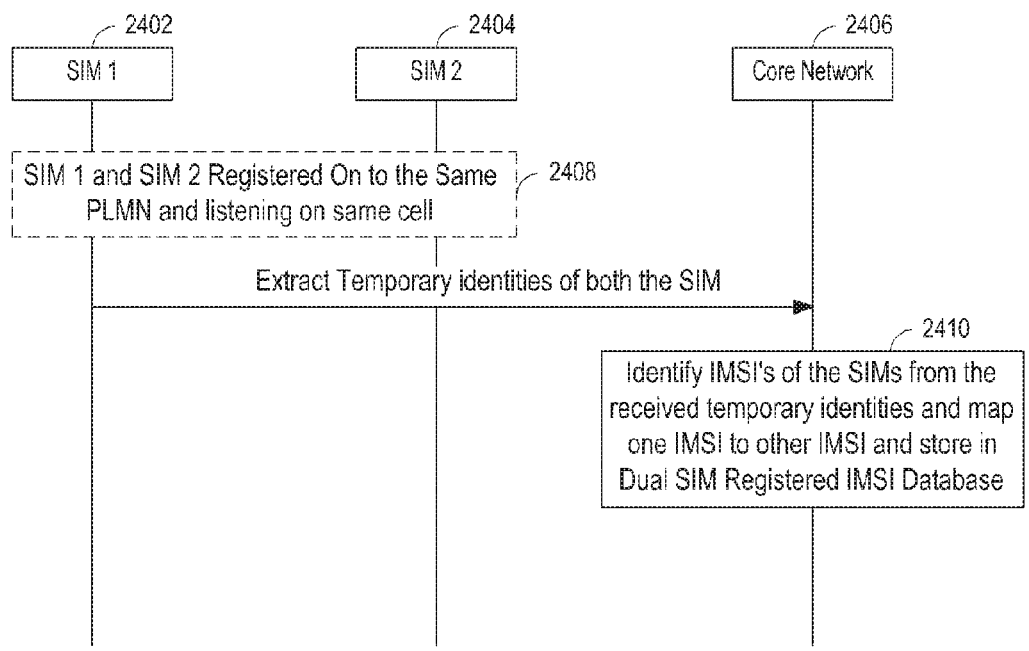
FIG. 24 is a flow diagram of a method of a dual SIM registered international mobile subscriber identity (IMSI) database, according to an embodiment of the present disclosure.

FIG. 24 is a flow diagram of a method of a dual SIM registered IMSI database.

Referring to FIG. 24, in step 2308, both of the SIMs (e.g. SIM 1 and SIM 2) 2402 and 2404 of the dual SIM mobile phone are registered on the same PLMN and listening on the same cell, i.e., it can be any one of the domains (CS or PS) or both of the domains (CS and PS) of the same network. During registration, the core network 2406 extracts the temporary identity of both of the SIMs 2402 or 2404.

The temporary identities of both of the SIMs extracted can be either for a common domain or for different domains depending on which domains the SIMs have registered. In step 2410, the IMSI's of the SIMs 2402 and 2404 are identified from the extracted temporary identities and one of the IMSI is mapped to the other IMSI and stored in the dual SIM registered IMSI database.

When one of the SIMs is deregistered from the network or one of the SIMs is registered on another PLMN then the core network removes this pair of IMSIs from the dual SIM registered IMSI database. This dual SIM registered IMSI database may be maintained in a visiting location register (VLR) and also in a home location register (HLR).

The various devices, modules, and the like described herein may be enabled and operated using hardware circuitry, for example, complementary metal oxide semiconductor (CMOS) based logic circuitry, firmware, software and/or any combination of hardware, firmware, and/or software embodied in a non-transitory computer readable recording medium.

While the present disclosure has been particularly shown and described with reference to certain embodiments thereof, it will be understood by those of ordinary skill in the art that various changes in form and details may be made therein without departing from the scope and spirit of the present disclosure, as defined by the appended claims and their equivalents.

What is claimed is:

1. A method of connecting a dual subscriber identity module (SIM) mobile communication device, comprising:
   receiving, by a receiver of a base station, a paging message for a first SIM of the mobile communication device in an idle mode;
   determining, by a processor of the base station, whether a radio resource control (RRC) connection linked with the first SIM is available;
   triggering, by the processor of the base station, a second paging type message for the first SIM with a mapped normal cause received through the RRC connection linked with the first SIM, if the RRC connection of the first SIM is available;
   determining, by the processor of the base station, whether the RRC connection linked with a second SIM is available, if the RRC connection of the first SIM is not available; and
   triggering, by the processor of the base station, a third paging type message for the first SIM with a mapped new cause through the RRC connection linked with the second SIM, if the second SIM is available.

2. The method of claim 1, further comprising triggering, by the processor of the base station, a first paging type message comprising a cause and a temporary identity through a paging channel, if the RRC connection linked with the second SIM is not available.

3. The method of claim 1, wherein a connection mode is a semi-connected mode if the first SIM is in an RRC connected mode with a core network and if the second SIM is in the idle mode.

4. The method of claim 1, wherein the first SIM receives the paging message from a core network.

5. The method of claim 1, wherein the paging message for the first SIM comprises at least one of an international mobile subscriber identity (IMSI) of the first SIM, an IMSI of the second SIM, and a temporary user equipment (UE) identity of the first SIM.

6. The method of claim 1, wherein the second paging type message and the third paging type message for the first SIM is received during at least one of terminating a conversational call, terminating a streaming call, terminating an interactive call, terminating a background call, terminating a high priority signaling, terminating a low priority signaling, and terminating a cause that is unknown.

7. The method of claim 1, wherein a core network maintains an international mobile subscriber identity (IMSI) database of at least one IMSI of the first SIM and the second SIM.

8. The method of claim 1, wherein triggering the second paging type message or the third paging type message comprises:
   determining, by a core network, whether a paging must be triggered for the communication device;
   determining, by the core network, whether a temporary identity of the communication device to be paged is available, if the paging is triggered;
   adding, by the core network, a temporary identity of the second SIM in the paging message, if the temporary identity of the communication device is available; and
   setting, by the core network, a neighbor identity to "NULL", if the temporary identity of the communication device to be paged is not available.

9. The method of claim 1, wherein the processor of the base station is configured to determine a maximum number of signaling connections that can be established through a single RRC connection.

10. The method of claim 1, wherein the processor of the base station is configured to map a maximum of four signaling connection identifiers to a single RRC connection identifier, and
    wherein two signaling connections are for the first SIM and two other signaling connections are for the second SIM.

11. A base station comprising:
    a receiver configured to receive a paging message for a first subscriber identity module (SIM) of a dual SIM mobile communication device in an idle mode; and
    a processor configured to
      determine whether a radio resource control (RRC) connection linked with the first SIM is available,
      trigger a second paging type message for the first SIM with a mapped normal cause through the RRC connection linked with the first SIM, if the RRC connection of the first SIM is available,
      determine whether the RRC connection linked with a second SIM is available if the RRC connection of the first SIM is not available, and
      trigger a third paging type message for the first SIM with a mapped new cause through the RRC connection linked with the second SIM if the second SIM is available.

12. The base station of claim 11, wherein the a processor is further configured to trigger a first paging type message comprising a cause and a temporary identity through a paging channel, if the RRC connection linked with the second SIM is not available.

13. The base station of claim 11, wherein a connection mode is a semi-connected mode if the first SIM is in an RRC connected mode with a core network and if the second SIM is in the idle mode.

14. The base station of claim 11, wherein the first SIM receives the paging message from a core network.

15. The base station of claim 11, wherein the paging message for the first SIM comprises at least one of an international mobile subscriber identity (IMSI) of the first SIM, an IMSI of the second SIM, and a temporary user equipment (UE) identity of the first SIM.

16. The base station of claim 11, wherein a core network maintains an international mobile subscriber identity (IMSI) database of at least one IMSI of the first SIM and the second SIM.

17. The base station of claim 11, wherein a core network determines whether a paging must be triggered for the communication device, determines whether a temporary identity of the communication device to be paged is available if the paging is triggered, adds a temporary identity of the second SIM in the paging message if the temporary identity of the communication device is available, and sets a neighbor identity to "NULL" if the temporary identity of the communication device to be paged is not available.

18. The base station of claim 11, wherein the processor is further configured to determine a maximum number of signaling connections that can be established through a single RRC connection.

19. The base station of claim 11, wherein the processor is further configured to map a maximum of four signaling connection identifiers to a single RRC connection identifier, and wherein two signaling connections are for the first SIM and two other signaling connections are for the second SIM.

20. A non-transitory computer-readable medium having instructions embedded thereon, wherein the instructions, when performed on a computer processor, execute a method of a dual subscriber identity module (SIM) mobile communication device, the method comprising:

receiving a paging message for a first SIM of the mobile communication device in an idle mode;

determining whether a radio resource control (RRC) connection linked with the first SIM is available;

triggering a second paging type message for the first SIM with a mapped normal cause received through the RRC connection linked with the first SIM, if the RRC connection of the first SIM is available;

determining whether the RRC connection linked with a second SIM is available, if the RRC connection of the first SIM is not available; and triggering a third paging type message for the first SIM with a mapped new cause through the RRC connection linked with the second SIM, if the second SIM is available.

\* \* \* \* \*